(12) United States Patent
Cattoor et al.

(10) Patent No.: US 12,158,204 B1
(45) Date of Patent: Dec. 3, 2024

(54) MODULAR POWER TAKE-OFF ON ELECTRIFIED TRANSMISSION

(71) Applicant: Dana Belgium N.V., Flanders (BE)

(72) Inventors: Kurt Cattoor, Koolkerke (BE); Filip Van Raepenbusch, Bruges (BE); Filip D. Schacht, Meulebeke (BE)

(73) Assignee: DANA BELGIUM N.V., Bruges (BE)

( * ) Notice: Subject to any disclaimer, the term of this patent is extended or adjusted under 35 U.S.C. 154(b) by 0 days.

(21) Appl. No.: 18/324,761

(22) Filed: May 26, 2023

(51) Int. Cl.
*F16H 3/06* (2006.01)
*F16H 3/00* (2006.01)
*F16H 3/72* (2006.01)
*F16H 61/688* (2006.01)

(52) U.S. Cl.
CPC ........... *F16H 61/688* (2013.01); *F16H 3/006* (2013.01); *F16H 3/728* (2013.01); *F16H 2200/0004* (2013.01); *F16H 2200/0021* (2013.01)

(58) Field of Classification Search
CPC .. F16H 61/688; F16H 3/006; F16H 2003/007; F16H 2200/0004; F16H 2200/0021; B60K 17/28
See application file for complete search history.

(56) References Cited

U.S. PATENT DOCUMENTS

| 9,391,490 | B2 | 7/2016 | Knudsen et al. | |
| 10,435,026 | B2 * | 10/2019 | Shively | B60K 25/06 |
| 11,274,718 | B2 * | 3/2022 | Northrup | F16D 67/02 |
| 11,525,506 | B2 * | 12/2022 | Hart | F16H 57/043 |
| 2016/0107522 | A1 | 4/2016 | Xykis et al. | |
| 2019/0140474 | A1 * | 5/2019 | Stoltz | H02J 7/16 |

FOREIGN PATENT DOCUMENTS

| DE | 102020000449 A1 | 7/2021 |
| WO | 2014163502 A1 | 10/2014 |

* cited by examiner

*Primary Examiner* — Derek D Knight
(74) *Attorney, Agent, or Firm* — McCoy Russell LLP

(57) ABSTRACT

An assembly comprising: a first electric motor coupled to an input shaft of a transmission via a first clutch; a second electric motor directly coupled to the input shaft of the transmission; a power take-off unit coupled to the first clutch; a first housing comprising the transmission; and a second housing comprising the power take-off unit and an power take-off assembly the power take-off unit is coupled to, where the second housing is fastened to the first housing.

20 Claims, 9 Drawing Sheets

410

| Clutch Apply Chart | | | |
|---|---|---|---|
| Mode | Clutch 1 | Clutch 2 | Clutch 3 |
| Gear 1 | OPEN | CLOSED | OPEN |
| Gear 1a (Gradebility) | CLOSED | CLOSED | OPEN |
| Gear 2 | OPEN | OPEN | CLOSED |
| Gear 2a (Gradabiltiy) | CLOSED | OPEN | CLOSED |
| PTO EM1 | OPEN | ANY | ANY |
| Neutral | ANY | OPEN | OPEN |

| PTO Apply Chart | | |
|---|---|---|
| Electric Machine | First Clutch Open | First Clutch Closed |
| EM 1 | PTO | PTO + Transmission |
| EM 2 | Transmission | Transmission |

FIG. 4B

| Torque Modes | | | |
|---|---|---|---|
| Power Flow | First Clutch | EM 1 Torque | EM 2 Torque |
| First Power Flow | OPEN | POSITIVE | ANY |
| Second Power Flow | OPEN | ANY | POSITIVE |
| Combined Power Flow | CLOSED | POSITIVE | POSITIVE |
| First Regen Power Flow | CLOSED | POSITIVE | NEGATIVE |

FIG. 5

MODULAR POWER TAKE-OFF ON ELECTRIFIED TRANSMISSION

TECHNICAL FIELD

The present description relates generally to a power take-off (PTO) system that may be included in a second housing separate from a first housing of an electrified transmission, and may be drivingly coupled to the rotational components of the electrified transmission. The PTO and second housing may be modular, able to include a plurality of configurations of gear sets, shafts, and other rotational elements, such that the second housing may house a plurality of ratios to produce different output torques and rotational speeds for the PTO.

BACKGROUND AND SUMMARY

Vehicles may have work implements. Such vehicles may include off-highway work vehicles, such as straddle carriers, forklifts, tractors, and some construction vehicles. Such vehicles may include on-highway vehicles, such as semi-trucks, utility vehicles, and some construction vehicles. Vehicles with work implements may be electrified. For example, an electrified vehicle with a work implement may be an all-electric vehicles (EVs). For another example, an electrified vehicle may be a hybrid vehicle with multiple sources of torque from electric machines and non-electric motors, such as internal combustion engines (ICEs). Additionally, a vehicle may integrate a power take-off (PTO) system to transfer mechanically energy from a vehicle to operate and affect a work implement. The PTO system and work implement may be used for a plurality of purposes, such as to power and drive a driven device, referred to herein as a PTO device. The PTO device may include a pump, a blower, an air conditioning (AC) unit, a generator, a drill, or another rotational element. Vehicles may incorporate a PTO in the transmission. The PTO system may be driven by a mover. The mover may be an electric machine and may operate as an electric motor. The vehicle may have a plurality of electric machines that may each act as a mover. The vehicle may maneuver frequently around objects and work in an environment with obstacles, while increasing or decreasing speed of movement during operations. If the vehicle travels at a speed above a first threshold, the vehicle may use two electric machines to transfer rotational energy to the gear train of the transmission to provide gradeability.

Due to the variation in size and power inputs for a plurality pumps, a single configuration of the PTO system may not be able to drive some of the pumps. Additionally, due to the variation in minimum and maximum thresholds power inputs for a plurality of other PTO devices, a single configuration of the PTO system may not be able to drive some of the other PTO devices. The configuration of the PTO system may be changed to increase the output torque to a PTO device, such as by increasing the diameter of ratios of reduction sets or increasing the quantity of reduction sets and shafts. However, if the PTO system is part of the transmission and housed in the transmission housing, the transmission housing may have to be disassembled to change configurations of the PTO system. Additionally, alterations to the PTO unit that may rearrange, replace, and add or remove rotational elements, such as shafts or gears, from the transmission of the vehicle, may decrease or increase the torque transferred to the gear train of the transmission (e.g., a transmission gear train), and therein the rotational energy output via torque by the transmission gear train. While a PTO system that is separate from the transmission may be used, such a PTO system may use components separate from the transmission. For example, a PTO system that is separate from the transmission, may use a mover, such as an electric machine that does not have an input to gear sets of the transmission. The separate PTO system and other components, such as the mover, may use additional packing space in addition to the packing space for the transmission and transmission housing. Additional packing space may not be available. For example, the vehicle housing the transmission and PTO unit may be reduced in size for maneuvering. For another example, the available internal packing space in the vehicle may have been reduced due to housing a larger power sources or another vehicle component from electrification of the vehicle. For the later example, the two motors that may deliver torque for greater gradeability at speeds above the threshold, may reduce the packing space of the vehicle compared to a non-electrified vehicle.

The inventors herein have recognized these and other issues with such systems. As developed in one example is an assembly comprising: a first electric motor coupled to a transmission via a first clutch; a second electric motor directly coupled to the transmission; a power take-off unit coupled to the first clutch; a first housing comprising the transmission; and a second housing comprising the power take-off unit, where the second housing is fastened to the first housing.

A first electric machine may be the first electric motor. A second electric machine may be the second electric motor. The first housing may further include a clutch that may selectively couple the first electric machine to a first gear train, referred to herein as a motor input gear train. The second housing may further include an optional disconnect, such as a clutch or simple disconnect that may selectively couple the power take-off (PTO) unit. The PTO unit may be a PTO system that drives an auxiliary device. The PTO unit may drivingly couple to the first electric machine. The PTO unit may have an implement. The implement may selectively couple to the other rotational elements of the PTO unit via an optional disconnect. The PTO unit may drivingly couple to the first electric machine via rotational elements of the first housing, such as a plurality gears and shafts, and a rotational element, such as an input gear, of the PTO unit. When drivingly coupled to the first electric machine, the rotational energy generated via the first electric machine may be transmitted to the rotational elements part of the PTO unit housed in the second housing via the input gear. When the optional disconnect is selectively coupled, the rotational elements of the PTO unit may transmit rotational energy via torque to the implement. The first electric machine may drive the PTO unit when the clutch is open. The first electric machine clutch may drive the PTO unit and the motor input gear train when the clutch is closed. The motor input gear train may be drivingly coupled to and transmit rotational energy via torque from the first electric machine and second electric machine to the transmission. Torque may be transmitted to and drive rotational elements of the motor input gear train. Torque may be transmitted to and drive the rotational elements of the transmission gear train from the motor input gear train. Torque may be transmitted to and drive the axle of the vehicle from transmission gear train.

Additionally, there may be a plurality of configurations of the second housing, with each providing different volumes of space for the components of the gear sets and rotational elements of the PTO unit. The modularity of the PTO unit and the second housing may allow for modifications to the torque and speed output by the PTO unit, without altering the gear sets and other rotational elements housed within the first housing. The second housing may be modular, such as to be capable of housing additional or reduced gear ratios from the examples shown. The modularity of the second housing, may allow gears and shafts to be reduced or increased in diameter. The increase or reduction of diameter of the gears and shafts may allow for different quantities of torque and output speeds to the PTO unit via changing the effective distances of ratios. A plurality of configurations of PTO units that may incorporate a single or a plurality gear sets, may each provide a different output PTO torques and rotational speeds. Likewise, a single or plurality of intermediate shafts may be interposed between the PTO shaft and the input gear to increase or decrease the offset distance between the PTO output and the first housing.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4A is a first table showing the clutch configurations for different operating gears modes of for the schematic of FIG. 2 and the example PTO assemblies of FIG. 2-3C.

FIG. 4B is a second table showing the applications of power from a plurality of electric machines to schematic of FIG. 2 and the example PTO assemblies of FIG. 2-3C.

FIG. 5 is a third table showing the conditions to engage power flows for the first clutch, first electric machine, and second electric machine of FIG. 1-2.

DETAILED DESCRIPTION

Figure 1:
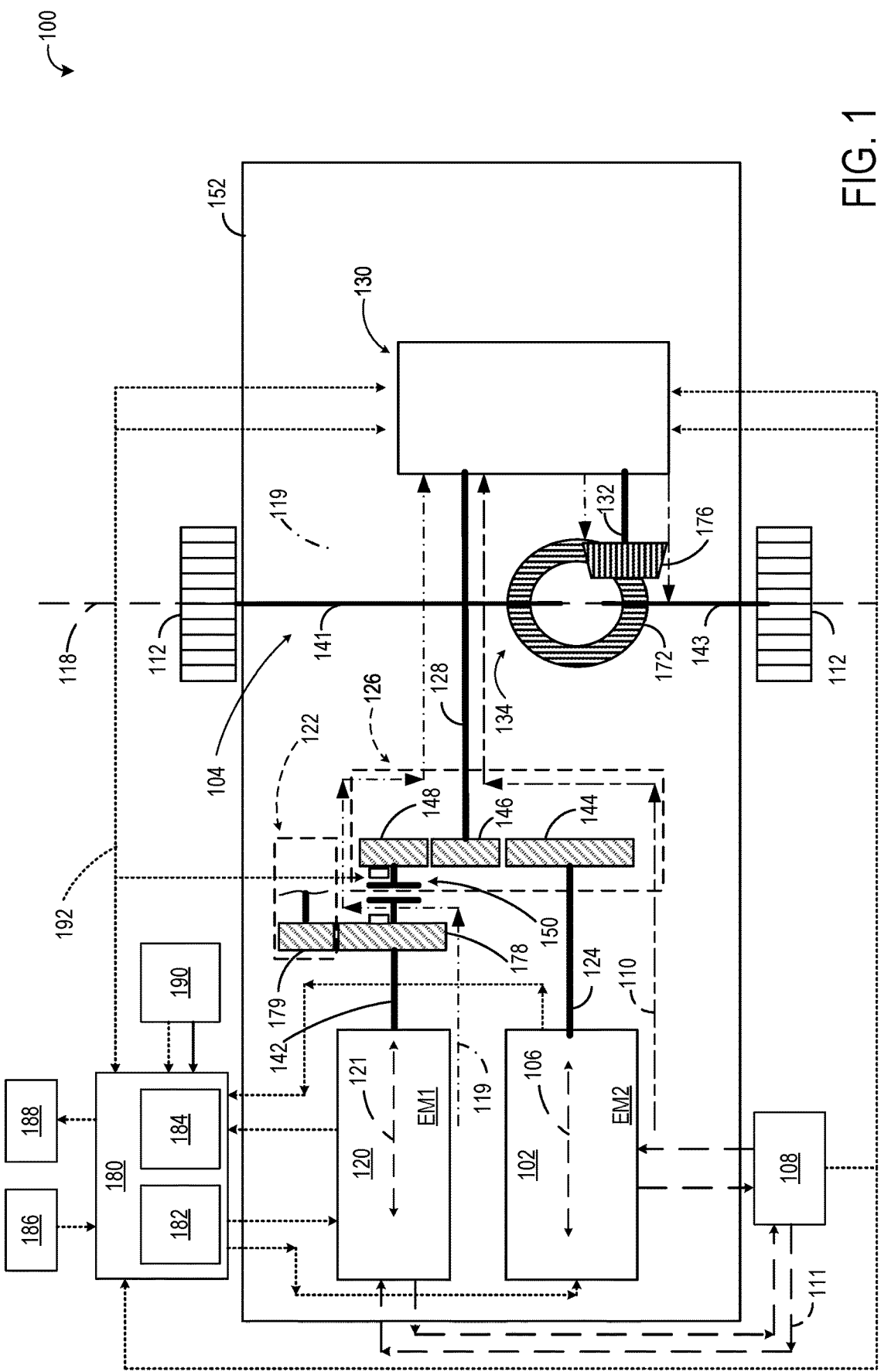
FIG. 1 is a schematic diagram of a first example for an electric axle assembly.

The following description relates to systems and methods for an electric axle that enables an output capability to drive an auxiliary device of an auxiliary system. The auxiliary system is a power take-off (PTO) system, referred to herein as a PTO unit. The PTO unit may drive a PTO device via an implement. PTO devices may include such as devices as a pump, a blower, an air conditioning (AC) unit, a generator, a drill, or another rotational element. The PTO device may be driven when selectively coupled to a plurality of a rotational elements of the PTO unit via an optional disconnect. As an example, the optional disconnect may be a simple disconnect. As another example, the optional disconnect may be a clutch.

The PTO unit may have a second housing, referred to herein as a PTO housing. The second housing is separate from a first housing that may house the rotational elements and other components of a transmission. The first housing may be referred to herein as a transmission housing. The PTO housing may house components of the PTO unit such as a plurality of rotational elements, such as gears and shafts, and portions of or the entirety of the PTO device. The housing may be modular, wherein a configuration of housing may house a plurality of configurations of rotational elements of the PTO unit. Likewise, there may be a plurality of configurations of PTO housing. The PTO housing may be of a bolt on configuration, wherein the PTO housing may be fastened to components of the transmission, such as the transmission housing, via a plurality of fasteners such as bolts.

The modular configuration of the PTO unit may allow for space enclosed by the housing to increase or decrease the size and quantity of rotational elements that drivingly couple and act as reduction ratios for a PTO device, such as a pump. The overall size of the transmission housing and the transmission may be reduced, as the rotational elements may not be enclosed. Additionally, the modular configuration of the PTO unit, may allow for a single configuration of gear trains enclosed by the transmission housing to be usable for multiple output torques and rotational speeds to PTO implements compared to other types of PTO units and PTO housing. Different configurations of gears, shafts, and other rotational elements, may be arranged such that each configuration of the PTO unit may output different rotational speeds and torques. The rotational elements of each PTO unit may be arranged to form a plurality of configurations for a single or plurality of gear sets or other forms of reductions sets. Multiple gear sets may provide multiple gear ratios resulting in different PTO torques and rotational speeds to an implement. Likewise, one or a plurality of intermediate shafts can be installed to increase or decrease the offset distance in between PTO output at the implement and housing in order to increase or decrease packing space for the PTO device to be fastened and drivingly coupled to the PTO unit. Additionally, the reduction ratios and intermediate shafts may be altered as described above to prevent increasing the size of the transmission, by providing increased or decreased torque output from the PTO unit without changing the size and/or positioning of the gears, shafts, and other rotational elements of the transmission.

Additionally, this description relates to a gear ratio or a plurality of gear ratios to supply a PTO unit and a PTO device torque and mechanical energy to an implement of the PTO device, such as an impeller of a pump. When fastened to the transmission, an input gear ratio may be formed between rotational elements coupled an electric machine and at least a first gear of the PTO unit. The first gear may be an input gear for the PTO unit. Rotational energy generated by first electric machine may transfer rotational energy via torque through a shaft to a gear of the transmission to the input gear of the PTO unit.

Likewise, rotational energy generated by the first electric machine and a second electric machine may be transmitted to a first gear train that may be referred to herein as a transmission gear train. The first electric machine may be drivingly coupled to the transmission gear train via a first clutch, a second gear train, and a plurality of shafts. The second electric machine may be drivingly coupled to the transmission gear train via the second gear train and a plurality of shafts. The second gear train may be referred to herein as a motor input gear train. The first clutch may be selectively coupled to a shaft that may be drivingly couple to the first electric machine. When the first clutch is closed to selectively couple to the shaft, the electric machine may be drivingly coupled to a gear of the motor input gear train. When selectively coupled to the shaft, rotational energy in the form of torque generated by the first electric machine may be split and supplied to both the PTO unit and the motor input gear train. When the gears of the motor input gear train are meshed together, the torque may be transferred through the motor input gear train to the transmission gear train.

The transmission gear train may be a single speed transmission or a multiple speed transmission, such as a two speed transmission. In one example, the two speed transmission may be a counter shaft layout with at least two sets of gears. Each of the two sets of gears may have at least two gears. Each of the two sets of gears drivingly couple at least two shafts. A first gear set of the power transmission gear train may have a first effective distance. A second gear set of the power transmission gear train may have a second effective distance. The first effective distance and second effective distance may each be of different distances, such that an output of the power transmission gear train may rotate at a first speed when drivingly coupled to the first gear set and the output of the power transmission gear may rotate at a second speed when drivingly coupled to the second gear set. When the first effective distance and second effective distance are different distances, the first speed may be a different speed from the second speed at the output when the power transmission gear train receives a same input of torque.

By utilizing the electric axle electric motor and gearing, alternative shaft and geared drives may be realized, and without costly additional motors and inverters. In some examples, a single electric axle may sufficiently propel a vehicle.

The gear sets, such as the motor input gear train, and other rotational elements of the axle system may facilitate brake regeneration for energy recovery using input from a plurality of wheel ends connected to the electric axle system. Likewise, the rotational energy output of the first electric machine directed to the motor input gear train may be used to regenerate energy to a power supply via the second electric machine. Alternatively, the rotational energy output of the second electric machine may send rotational energy to regenerate power to a power supply via the first electric machine.

Figure 2:
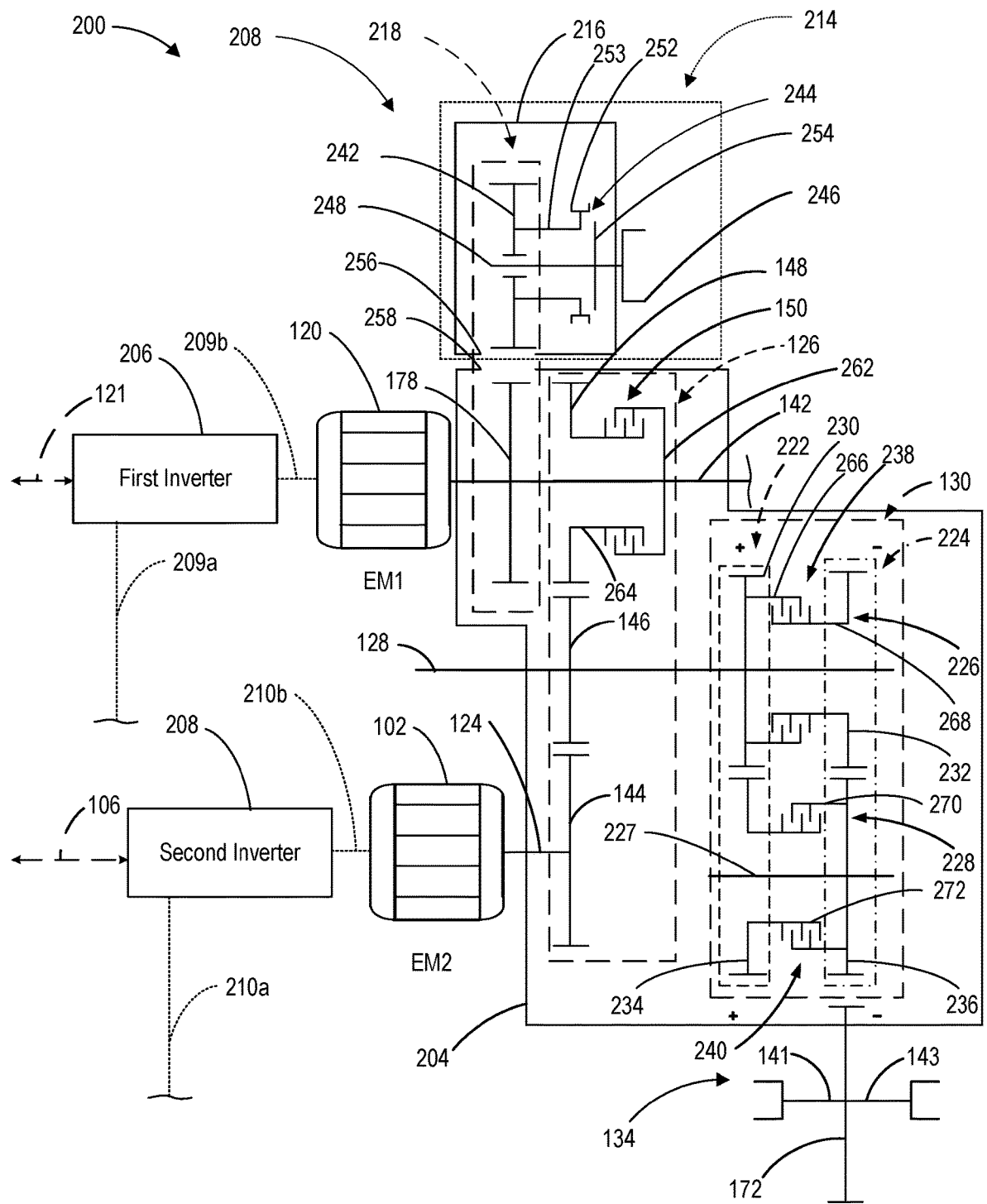
FIG. 2 is a schematic diagram of an example of a first PTO unit and transmission gear train.
Figure 3A:
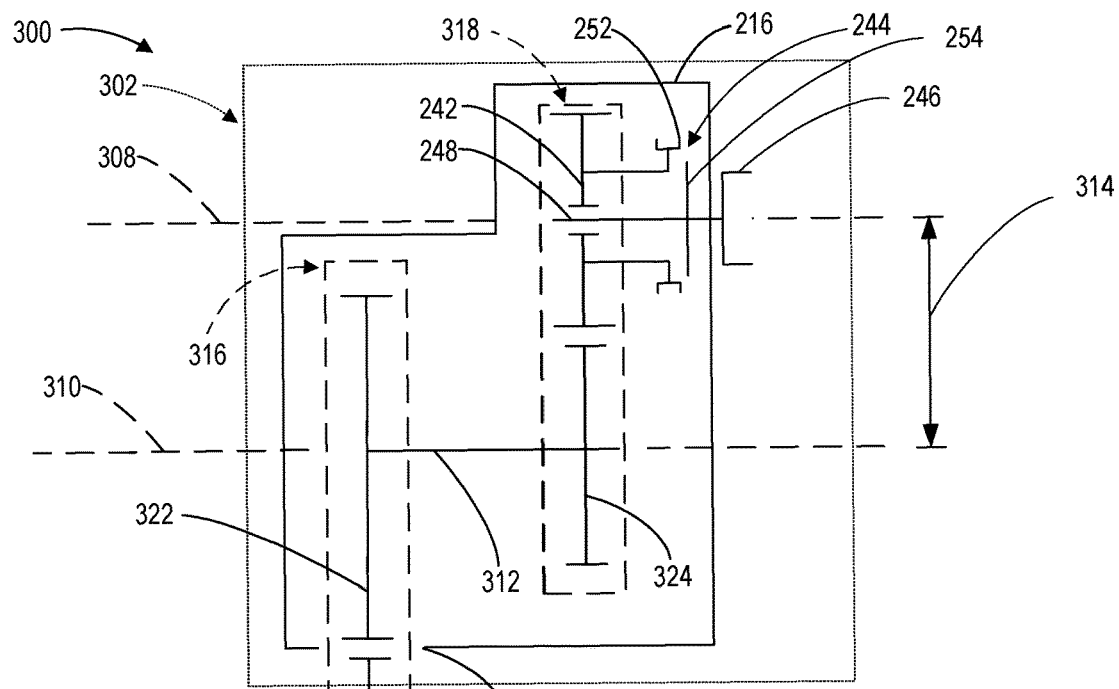
FIG. 3A is a schematic of an example of a second PTO unit.
Figure 3B:
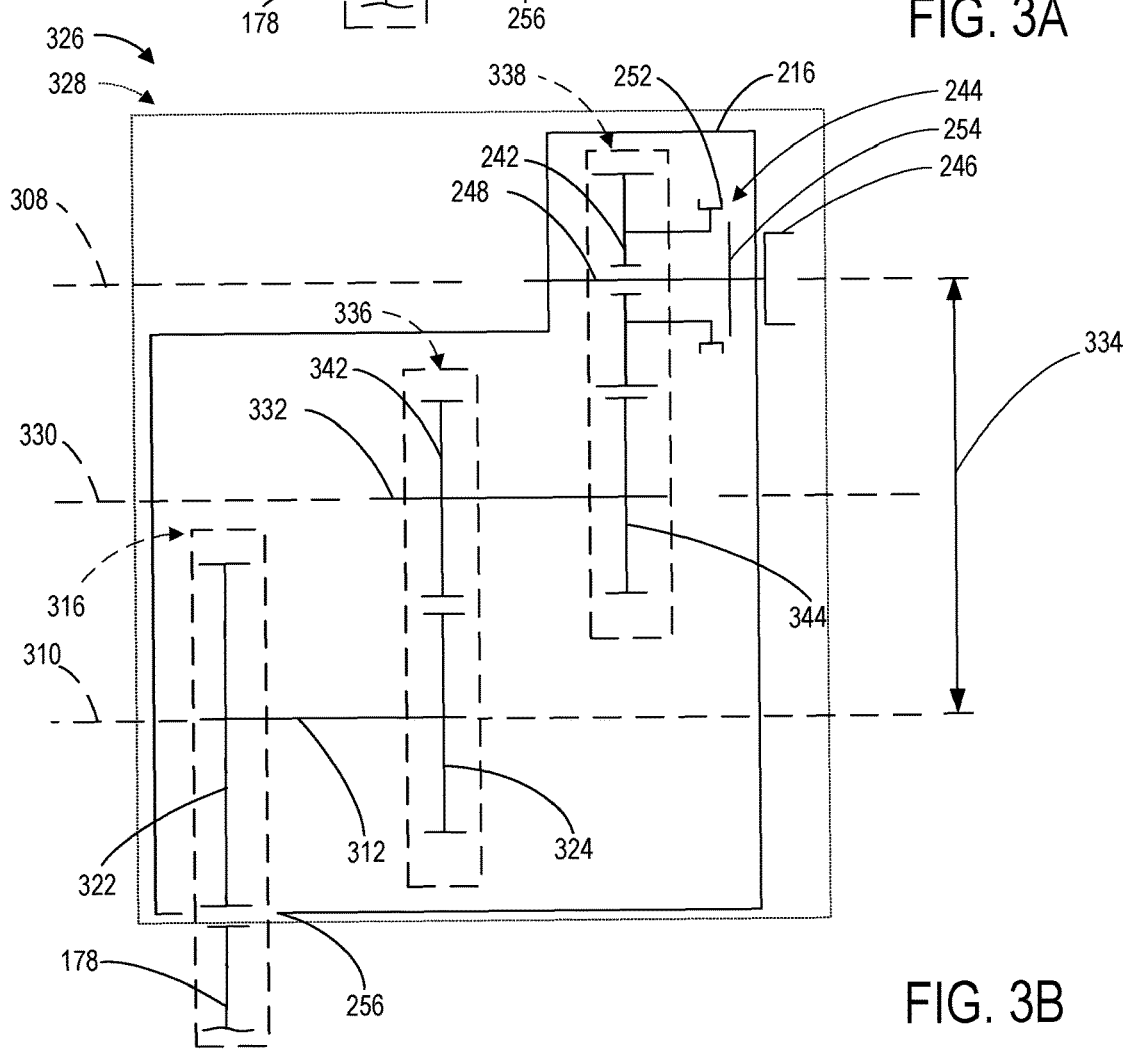
FIG. 3B is a schematic of an example of a third PTO unit.
Figure 3C:
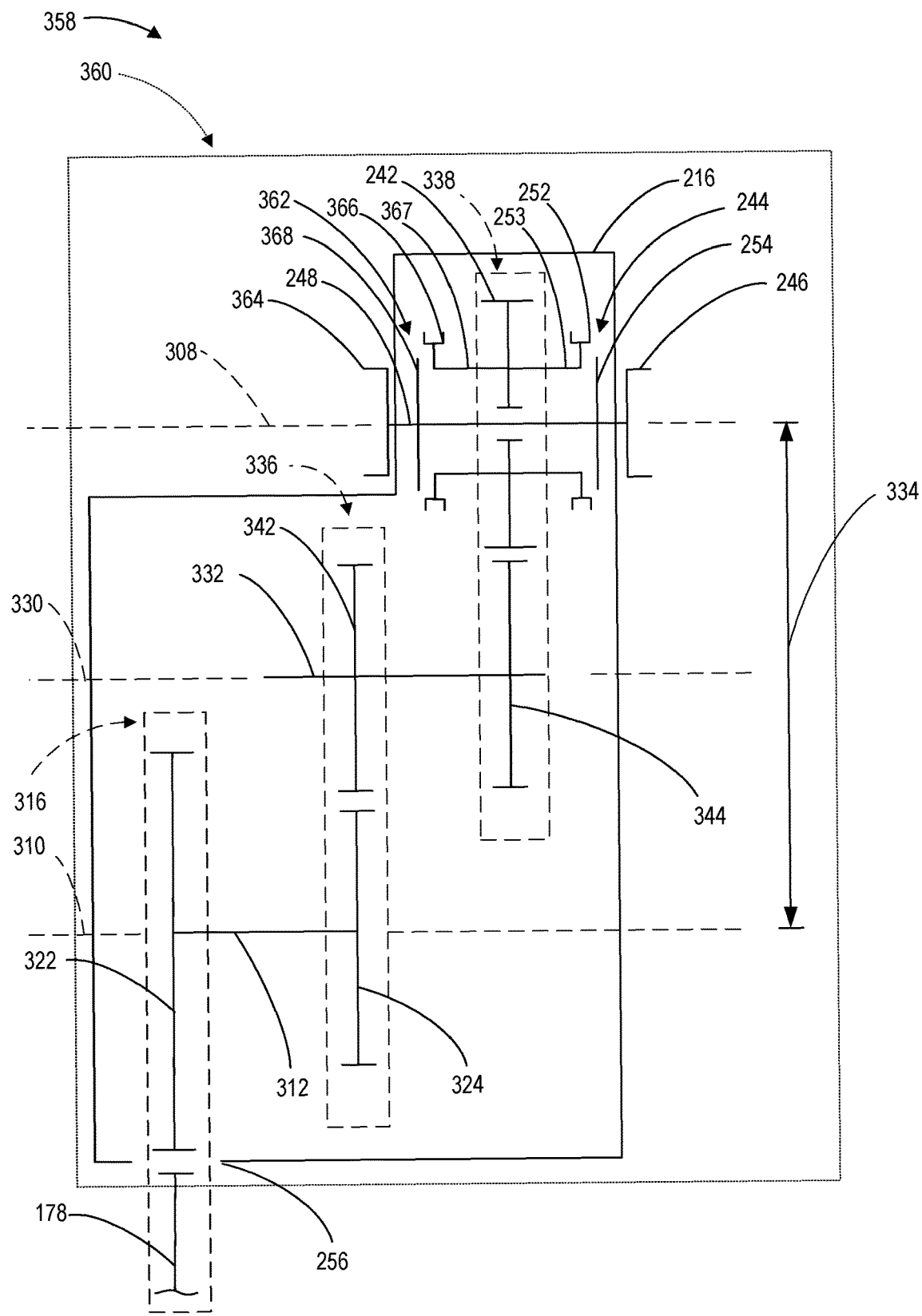
FIG. 3C is a schematic of an example of a fourth PTO unit.

An example system for an electric axle having the disclosed output capability is illustrated in FIG. 1. FIG. 1 is a schematic diagram of a first example for an electric axle assembly. FIG. 2 is a schematic diagram of a first PTO unit and transmission. FIG. 2 shows a simplified schematic of the rotational elements of the first PTO unit and transmission isolated from the controllers and a housing of the axle system such as the body of a vehicle. FIG. 2 also shows a schematic of the housing of the PTO unit and the transmission. FIG. 3A is a schematic of a second PTO unit. FIG. 3B is a schematic of a third PTO unit. FIG. 3C is a schematic of a fourth PTO unit. The second, third, and fourth PTO units of FIGS. 3A-3C may be example configurations demonstrating the modularity of the PTO unit. The first, second, third, and fourth PTO units may each be PTO assemblies and drivingly couple and have torque transmitted from electric machines via rotational elements of a transmission assembly of FIG. 2.

Figure 6A:
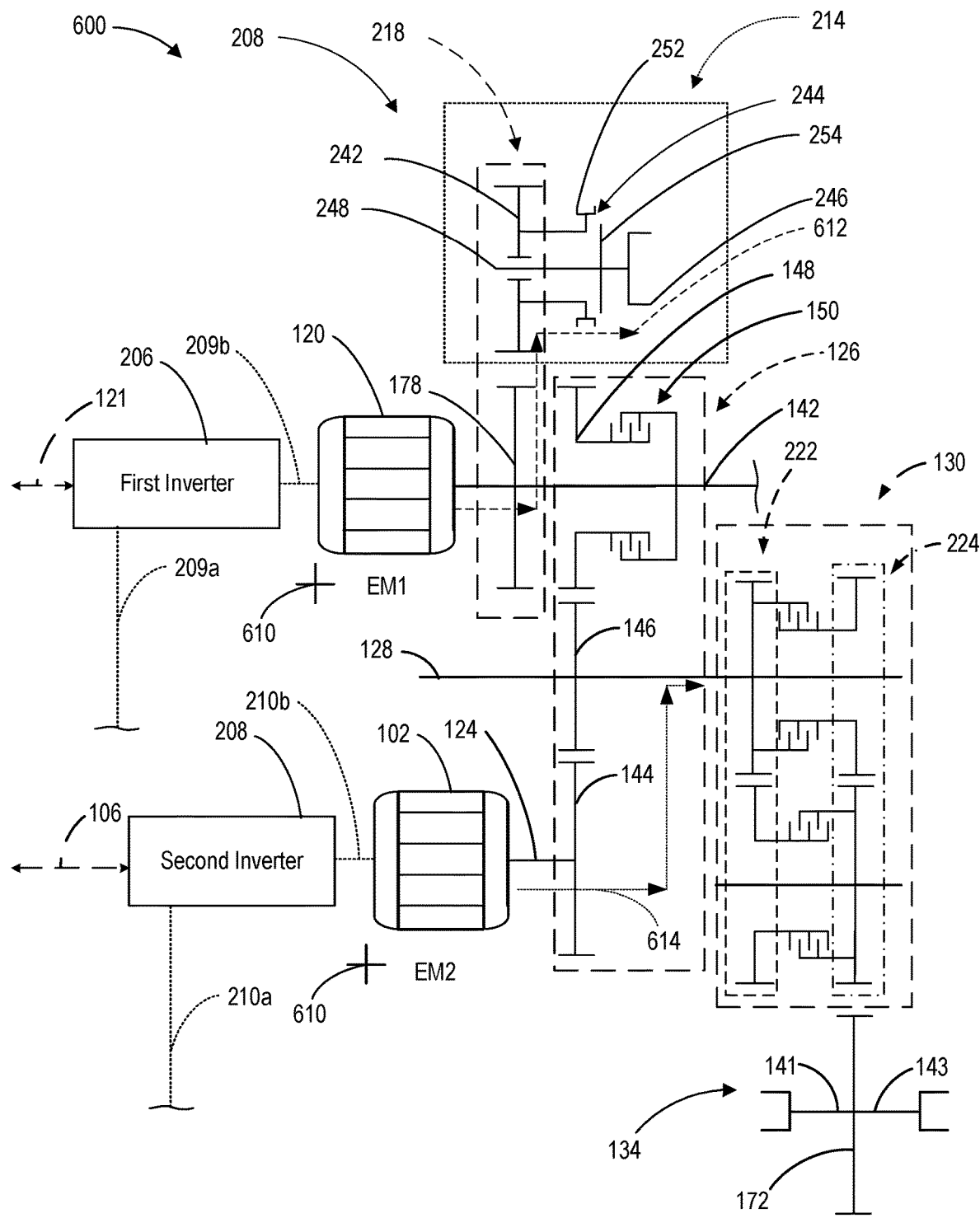
FIG. 6A shows a first and a second power flow of FIG. 5 through the schematic diagram of FIG. 2.
Figure 6B:
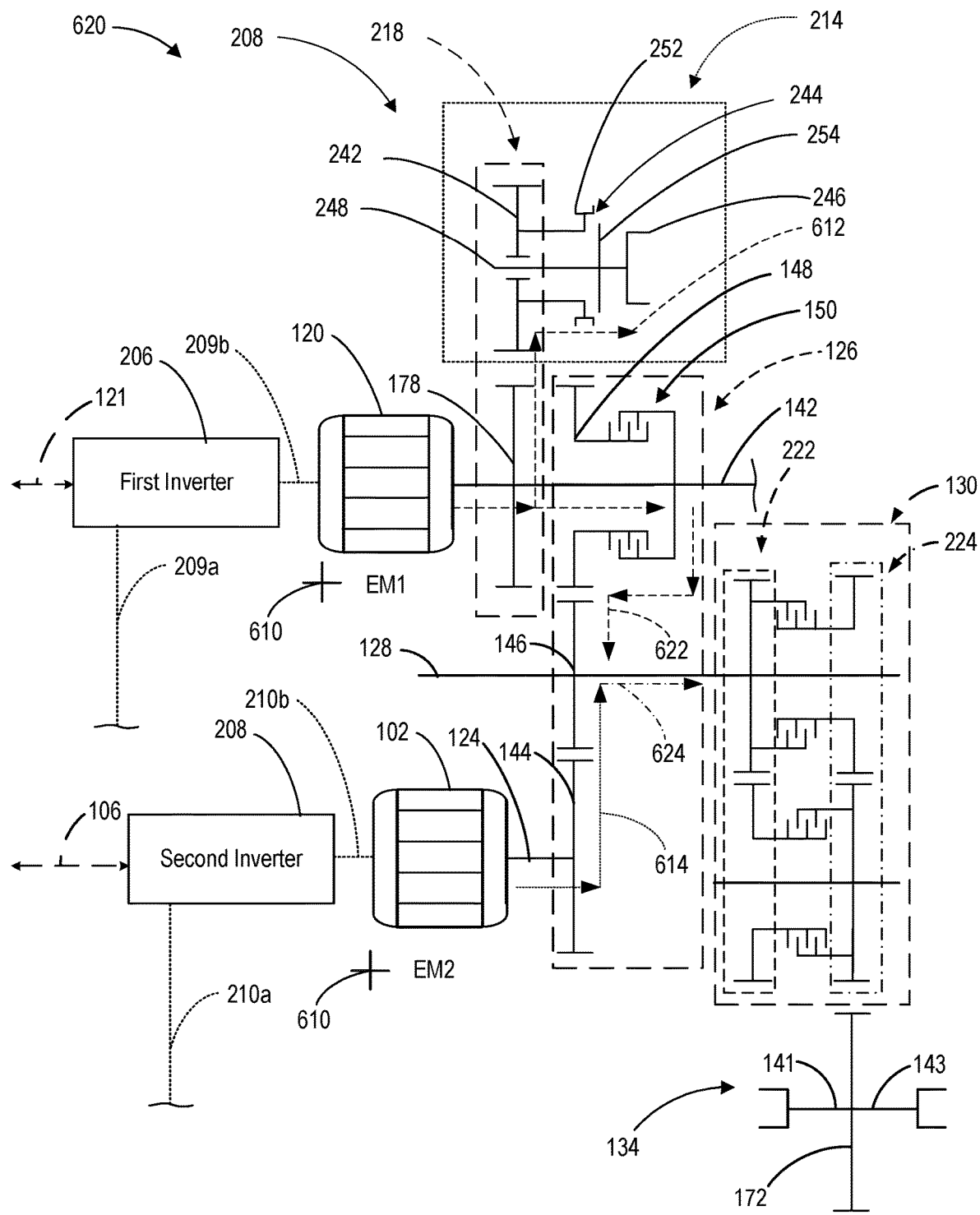
FIG. 6B shows a third power flow to deliver a combined torque of FIG. 5 through the schematic diagram of FIG. 2.
Figure 6C:
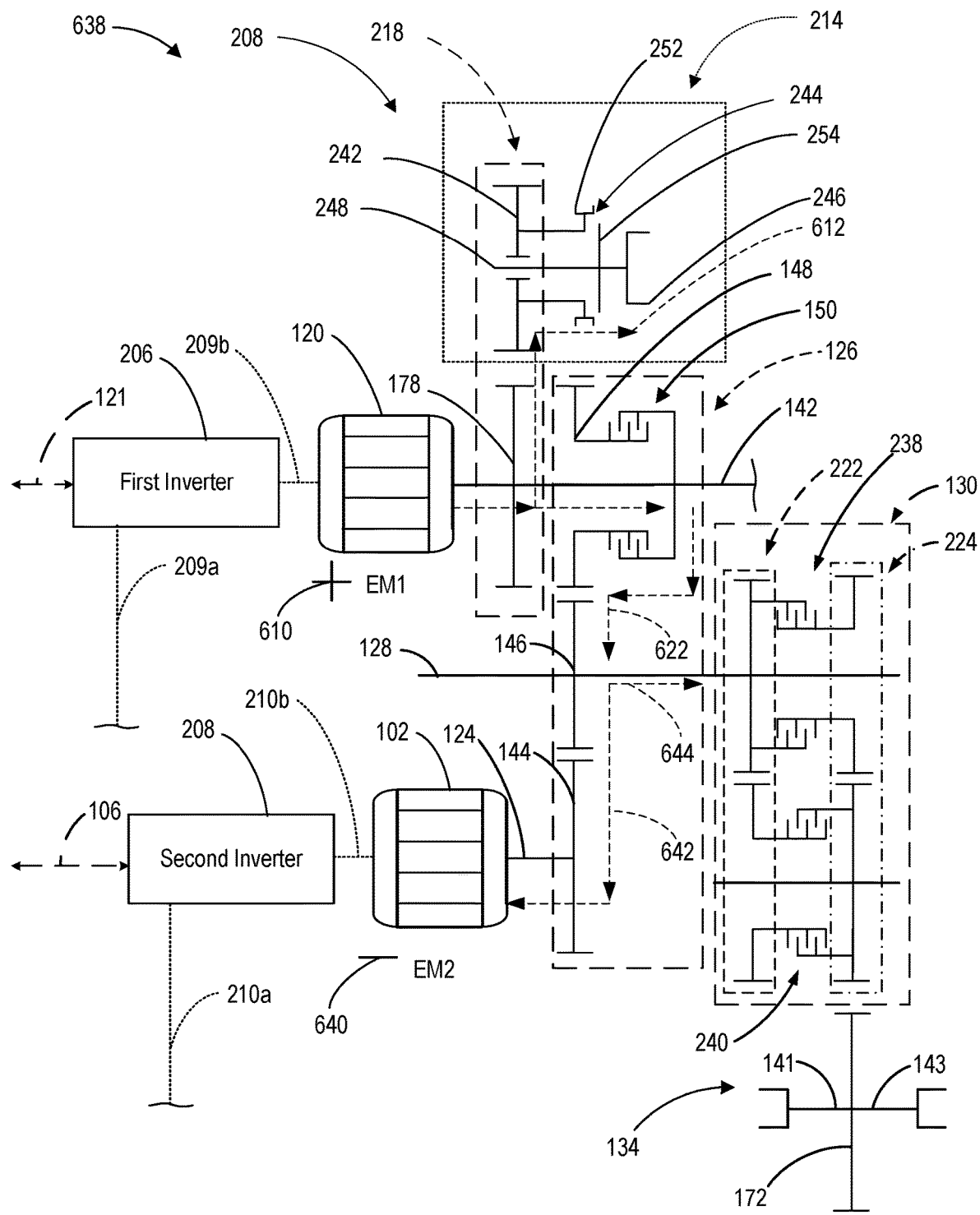
FIG. 6C shows a fourth power flow to deliver a first regenerative torque of FIG. 5 through the schematic diagram of FIG. 2.

FIG. 4A is a first table showing the clutch configurations for different operating gears modes of for the schematic of FIG. 2 and the example PTO assemblies of FIG. 2-3C. FIG. 4B is a second table showing the applications of power from a plurality of electric machines to schematic of FIG. 2 and the example PTO assemblies of FIG. 2-3C. Applications of power may include transmission of power from a motor to a PTO unit and/or a transmission gear set. FIG. 5 is a third table showing the conditions to engage power flows for the first clutch, first electric machine, and second electric machine of FIG. 1-2. The power flows of FIG. 5 may be overlaid in the schematic diagram of the gear sets of FIG. 2 in FIGS. 6A-6C. FIG. 6A shows a first and a second power flow through the schematic diagram of FIG. 2. FIG. 6B shows a third power flow to deliver a combined torque through the schematic diagram of FIG. 2. FIG. 6C shows a fourth power flow to deliver a first regenerative torque through the schematic diagram of FIG. 2.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

FIGS. 1-3C and FIGS. 6A-C show schematics of example configurations with relative positioning of the various components.

If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with an axis referenced unless otherwise specified. Features described as counter-axial may be approximately perpendicular to the axis referenced unless otherwise specified. Features described as radial may circumferentially surround or extend outward from an axis, such as the axis referenced, or a component or feature described prior as being radial to a referenced axis, unless otherwise specified.

Features described as longitudinal may be approximately parallel with an axis that is longitudinal. A lateral axis may be normal to the longitudinal axis. Features described as lateral may be approximately parallel with the lateral axis and normal to the longitudinal axis.

Turning to FIG. 1, it shows an example configuration for an electric axle system 100. In one example, the electric axle system 100 includes a second electric machine 102 directly mounted to an axle 104. The second electric machine 102 may be an electric motor that may include conventional components such as a stator, rotor, rotor shaft, and the like to enable the electric motor to generate mechanical power and electrical energy, when the motor is designed for regeneration. The rotational axis 106 of the second electric machine 102 is provided. The axle 104 may be centered about an axis 118. The second electric machine 102 may receive electrical power from a power supply, such as a battery 108, to provide torque to the axle 104. In some examples, second electric machine 102 may provide electrical power to a power supply, such as the battery 108, via regenerative processes, such as during breaking, or as a generator. There may be a plurality of electrical couplings 111, represented by a plurality of dashed arrows. Some of the electrical couplings 111 may electrically couple the battery 108 to the second electric machine 102. Electrical power may be delivered from the battery 108 to the second electric machine 102 via the electrical couplings 111. Likewise, electrical power may be delivered from the second electric machine 102 to the battery 108 via the electrical couplings 111. A plurality of double dashed lines with arrows indicates a first power path 110 of the electric axle system 100. The first power path 110 comprises a plurality of internal gears and shafts for transmitting power from the second electric machine 102 to the axle 104. The axle 104 may be rotatably coupled with a pair of wheels 112 via a first axle half shaft 141 and a second axle half shaft 143. The first axle half shaft 141 may be rotatably coupled to one of the pair of wheels 112. The second axle half shaft 143 may be rotatably coupled to another one of the pair of wheels 112.

Additionally, the electric axle system 100 may have a first electric machine 120. The first electric machine 120 may be an electric motor that may include conventional components such as a stator, rotor, rotor shaft, and the like to enable the electric motor to generate mechanical power and electrical energy, when the motor is designed for regeneration. The rotational axis 121 of the second electric machine 102 is provided. The first electric machine 120 may receive electrical power from a power supply, such as the battery 108, to provide torque to the axle 104. In some examples, the first electric machine 120 may provide electrical power to a power supply, such as the battery 108, via regenerative processes, such as during breaking, or as a generator. Some of the electrical couplings 111 may electrically couple the battery 108 to the first electric machine 120. Electrical power may be delivered from the battery 108 to the first electric machine 120 via the electrical couplings 111. Likewise, electrical power may be delivered from the first electric machine 120 to the battery 108 via the electrical couplings 111. A plurality of dashed dotted lines with arrows indicates a second power path 119 of the electric axle system 100. The second power path 119 comprises a plurality of internal gears and shafts for transmitting power from the first electric machine 120 to the axle 104.

The first electric machine 120 and second electric machine 102 may generate mechanical energy that may be transferred through the axle 104 to drive the wheels 112 about the axis 118. In some examples, the electric axle system 100 may selectively provide rotational mechanical energy to power an auxiliary axle, e.g., a traditional axle, or auxiliary device e.g., a PTO device. For this example, the first electric machine 120 may be drivingly coupled to a PTO unit 122 with an optional disconnect. The PTO unit 122 may be enclosed by a plurality of dashed lines. The PTO unit 122 may be removable from the axle system 100. The first electric machine 120 and second electric machine 102 may transmit rotational energy via torque to the other rotational elements of the axle system, with or without the PTO unit 122 being drivingly coupled to the first electric machine 120.

In one example, the first power path 110 of electric axle system 100 may include a first shaft 124 (acting as an output from the second electric machine 102), a motor input gear train 126, a second shaft in the form of a transmission input shaft 128 (also herein referred to as an input shaft or input shaft 128), a transmission gear train 130 (also herein referred to as a transmission gear train or transmission gear train 130), an output shaft 132, and a hypoid gear set 134. Additionally or alternatively, the second power path 119 may include a second shaft 142 (acting as an output of the first electric machine 120), a first clutch 150, the motor input gear train 126, the transmission input shaft 128, the transmission gear train 130, the output shaft 132, and the hypoid gear set 134. Power may also split from the second power path 119 and be sent to the PTO unit 122. Power transmitted from the second power path 119 to the PTO unit 122 may be transmitted through the rotational elements of the PTO unit 122.

The first shaft 124 may drivingly couple the second electric machine 102 to the motor input gear train 126. The transmission input shaft 128 may drivingly couple the motor input gear train 126 to the transmission gear train 130. The transmission gear train 130 may have a single or plurality clutches, such as a second clutch 238 and a third clutch 240 shown in FIG. 2. The aforementioned clutches may be used to change the gear set and therein the speed output by the transmission gear train 130 to the output shaft 132. The output shaft 132 may drivingly couple the transmission gear train 130 to the axle 104. In particular, the output shaft 132 may be drivingly coupled to the hypoid gear set 134, and the hypoid gear set 134 may be drivingly coupled to a first axle half shaft 141 and a second axle half shaft 143. Different sizes of torque may be transmitted to the first axle half shaft 141 and the second axle half shaft 143 from the hypoid gear set 134, such that the first axle half shaft 141, second axle half shaft 143, and their respective wheels 112 may rotate at different speeds.

The electric axle system 100 may be a self-contained axle assembly. The electric axle system 100 may include a housing or enclosure, shown as housing 152 that contains and supports the components of the electric axle system 100. As shown, the housing 152 at least partially (e.g., partially, completely) encloses the components of the first power path 110 and the second power path 119 from the second electric machine 102 to the axle 104 including the first shaft 124, the second shaft 142, the first clutch 150, the motor input gear train 126, the transmission input shaft 128, the transmission gear train 130, the output shaft 132, and the hypoid gear set 134. The first and second axle half shafts 141, 143 may extend outside of the housing 152 to couple to the wheels 112.

The motor input gear train 126 is indicated and enclosed by a dashed box. The motor input gear train 126 is an input gear train for motors, such as the first and second electric machines 120, 102, to transfer and combined rotational energy before being transferred to the transmission gear train 130. The motor input gear train 126 may comprise a first gear 144 in mesh with a second gear 146. In one example, the first gear 144 and second gear 146 may form an initial gear reduction. The first shaft 124 may drivingly couple to the first gear 144. Additionally, the motor input gear train 126 may have a third gear 148. The first gear 144 may be a first input gear to motor input gear train 126. The third gear 148 may be a second input gear to the motor input gear train 126. The second gear 146 may be an output gear for the motor input gear train 126 and an input gear for the transmission input shaft 128.

A first clutch 150 may selectively couple the second shaft 142 to the third gear 148. The first clutch 150 is a PTO clutch. As a PTO clutch, when open in an open configuration, the first clutch 150 may direct rotational energy generated by the first electric machine 120 to the PTO unit 122. When closed in a closed configuration, the first clutch 150 may direct rotational energy generated by the first electric machine 120 to the PTO unit 122 and to the motor input gear train 126. The second shaft 142 may be drivingly coupled to the first electric machine 120. When selectively coupled via the first clutch 150, the second shaft 142 may drivingly couple the first electric machine 120 to the third gear 148 and the motor input gear train 126.

Numerous suitable gear ratios have been contemplated. The gear ratio selected for the initial gear reduction, and the other gear passes described herein may be selected based on a variety of factors such as the expected operating speed of the motor, the expected transmission load, a desired vehicle speed range, and the like.

In one example, the transmission gear train for the electric axle system 100 may comprise a plurality of parallel shafts having a plurality of helical gears in constant mesh. For example, the transmission gear train 130 may be a two speed transmission, with at least two parallel shafts and four gears. The gears may be helical gears and intermeshed. Clutches of the transmission gear train 130 may be operated in various combinations (e.g., electrically, pneumatically, hydraulically, etc.) to realize a multiple speed gear capability.

In one example, the output shaft 132 may be rotationally coupled to the hypoid gear set 134, comprising a gear 172 (e.g., a ring gear) in a differential, or other suitable downstream component, and gear 176 (e.g., pinion gear). Alternatively, the gear 172 may be coupled to a driveline or may be another suitable type of mechanical interface. The gear 176 may specifically be a bevel gear, in one example. However, a variety of suitable output gears have been contemplated (e.g., helical, spur).

The second shaft 142 may drivingly couple to a fourth gear 178. The first electric machine 120 may be drivingly coupled to the fourth gear 178 via the second shaft 142, and the second shaft 142 may be drivingly coupled to the PTO unit 122 via the fourth gear 178. Torque generated by the first electric machine 120 may be transmitted to the PTO unit 122 via the fourth gear 178. The fourth gear 178 may mesh with and drivingly couple to an input gear 179 to drivingly couple to the PTO unit 122.

The electric axle system 100 may be electronically connected (e.g., wirelessly or wired) to a controller 180. The controller 180 may include a processor 182 operatively connected to a memory 184. The memory 184 may be a non-transitory computer-readable medium and may be configured to store executable instructions (e.g., computer executable code) to be processed by the processor 182 in order to execute one or more control methods. The memory 184 may also be configured to store data received by the processor 182.

The controller 180 receives signals from the various sensors 186 and employs the various actuators 188 to adjust system operation based on the received signals and instructions stored on the memory 184 of the controller 180. Sensors 186 may include motor speed sensors (for the first and second electric machines 120, 102), shaft/gear speed sensors, current sensors, temperature sensors, humidity sensors, and so on for monitoring the electric axle system 100. As another example, an input device 190 (e.g., accelerator pedal, brake pedal, gear selector, combinations thereof, and so on) may further provide input signals indicative of an operator's intent for vehicle control.

Signals may be sent to the controller 180 via a plurality of communicative couplings 192. For example, the first electric machine 120, the second electric machine 102, and the sensors 186 may send signals to the controller 180 via a plurality of communicative couplings 192. A single or plurality of the sensors, such as a one or more of the sensors 186, may send the status of whether clutches, such as the first clutch 150, are engaged or disengaged. Likewise, the communicative couplings 192 may send signals with commands to adjust components of the electric axle system 100, such as the first electric machine 120, second electric machine 102, and actuators 188. Some of actuators 188 may actuate clutches, such as the first clutch 150 or the clutches of the transmission gear train 130. The communicative couplings 192 may be represented by a plurality of dotted lines with arrows.

Upon receiving the signals from the various sensors 186 of FIG. 1, the controller 180 processes the received signals, and employs various actuators 188 of vehicle components to adjust the components based on the received signals and instructions stored on the memory of controller 180.

For example, the controller 180 may receive an input device 190 signal indicative of an operator request for a vehicle acceleration adjustment. In response, the controller 180 may command operation of the second electric machine 102 to increase the power delivered to the transmission gear train 130. For another example, the controller 180 may receive an input device 190 signal indicative of an operator request for increase in power to the PTO unit 122. In response, the controller 180 may send signals and command an operation for the first electric machine 120 to increase the power delivered to the PTO unit 122. The controller 180 may, during certain operating conditions, be designed to send commands to the clutches, such as the first clutch 150 or clutches of the transmission gear train 130. Commands from the controller may include commands to actuators of the clutches to engage or disengage their respective clutches to selected gears. For example, the control system may have instructions stored on the memory of the controller 180 that when executed cause the controller 180 to select a mode of operation, such as an operating gear, and based on the mode of operation selected, the controller may adjust one or more clutches.

For example, the controller 180 may have instructions stored to close the first clutch 150 so power as rotational energy via torque generated by both the first electric machine 120 and second electric machine 102 may be transferred to the motor input gear train 126 and the transmission gear train 130. The first clutch 150 may be adjusted closed by a single or plurality of actuators, such as a one or more of the actuators of various actuators 188.

FIG. 2 shows a second schematic 200 of gears, shafts, and other rotational elements that may be drivingly coupled to a first PTO unit 214, the motor input gear train 126, and/or the transmission gear train 130. The first PTO unit 214 may be a configuration of the PTO unit 122 of FIG. 1.

The second schematic 200 may have a first housing and a second housing. The first housing is a transmission housing 204. The transmission housing 204 may house components part of the transmission of an axle system, such as the axle system 100 of FIG. 1. The second housing is a PTO housing 216 for a first PTO unit 214. The transmission housing 204 may house the motor input gear train 126, the transmission gear train 130, and the fourth gear 178. For an embodiment, the transmission housing 204 may house portions of the first shaft 124, the transmission input shaft 128, and the second shaft 142. For this embodiment, the first electric machine 120 and second electric machine 102 may be external to the transmission housing 204. However, for other embodiments the first and/or second electric machines 120, 102 may be fully housed by and not have a portion extending beyond the transmission housing 204. Likewise, if the first and second electric machines 120, 102 are housed by the transmission housing, the second and first shafts 142, 124 respectively, may be housed in their entirety in the transmission housing 204.

PTO housing 216 may fasten to the transmission housing 204 via fasteners. The PTO housing 216 and the first PTO unit 214 may be fastened to the transmission housing 204 via a bolt on arrangement, wherein the fasteners may be bolts threaded through material of the PTO housing 216 and first PTO unit 214. The PTO housing 216 may be modular, with a plurality of configurations of the PTO housing 216 that may be fastened to the first PTO unit 214. Additionally, the first PTO unit 214 may have a plurality of configurations of rotational elements, such as sets of gear and shafts that may be housed by the PTO housing 216.

A first set 218 of gears may extend from the transmission housing 204 through to the PTO housing 216. The first set 218 may include a gear housed by the transmission housing 204 and a gear housed in the PTO housing 216. For one example the first set 218 may include the fourth gear 178 meshed with at least a first gear of the first PTO unit 214.

For an example of a configuration, the first electric machine 120 may have a first inverter 206. The first electric machine 120 may be electrically coupled to the first inverter 206. Likewise, for this example, the second electric machine 102 may have a second inverter 208. The second electric machine 102 may be electrically coupled to the second inverter 208. The first and second inverters 206, 208 may be electrically coupled to a power supply, such as battery 108 of FIG. 1. The first inverter 206 may be electrically coupled to the power supply via a first electrical coupling 209a. The first inverter 206 may be electrically coupled to the first electric machine 120 via a second electrical coupling 209b. Likewise, the second inverter 208 may be electrically coupled to a power supply via a third electrical coupling 210a. The second inverter 208 may be electrically coupled to the first electric machine 120 via a fourth electrical coupling 210b. The first inverter 206 may receive a direct current (DC) from the power source, via the first electrical coupling 209a. The first inverter 206 may convert the DC to alternating current (AC) and send the converted current to the first electric machine 120, via the second electrical coupling 209b. The second inverter 208 may receive a DC from the power source, via the third electrical coupling 210a. The second inverter 208 may convert the DC to AC and send the converted current to the second electric machine 102, via the fourth electrical coupling 210b.

The transmission gear train 130 may be arranged in a head pass (+) and a tail pass (−). The gears arranged in the head pass (+) are in mesh and the gears arranged in the tail pass (−) are in mesh. For an embodiment, the transmission gear train 130 is a two speed transmission configuration. However, it is to be appreciated that the transmission gear train may be greater than a two speed transmission and have more gear sets than two. The gears arranged in head pass (+) are part of a second set 222 of gears. The gears arranged in the tail pass are in a third set 224 of gears. The second and third sets 222, 224 are reduction sets. The second set 222 may be of a first ratio. The third set 224 may be of a second ratio. The first ratio is of a different effective distance than the second ratio. The second set 222 and third set 224 may each output a different rotational speed and torque to the ring gear 172 when a rotational energy of the same torque input and transmitted through either set. The second set 222 may transmit a first speed and a first torque. Likewise, the third set 224 may transmit a second speed and a second torque. The second and third sets 222, 224 may drivingly couple the transmission input shaft 128 to an intermediate shaft 227. There may be at least two gears for each of second set 222 and the third set 224. For the second schematic 200, an embodiment of the transmission gear train 130 may drivingly couple to the ring gear 172 and mesh directly with the gears of a set, such as the third set 224, instead of meshing with a pinion gear drivingly coupled to the transmission gear train 130, such as pinion gear 176 of FIG. 1. For an example the ring gear 172 may be drivingly coupled and meshed with a gear of the third set 224.

A first pair of gears 226 may be located about the transmission input shaft 128. A second pair of gears 228 may be located about the intermediate shaft 227. The first pair of gears 226 may include a fifth gear 230 and a sixth gear 232. The fifth gear 230 may be part of the second set 222. The sixth gear 232 may be part of the third set 224. The fifth gear 230 may be fastened, joined, or physically coupled to the input shaft 128. The sixth gear 232 may rotate freely about the transmission input shaft 128. The second pair of gears 228 may include a seventh gear 234 and an eighth gear 236. The seventh gear 234 may be part of the second set 222 and meshed with the fifth gear 230. The eighth gear 236 may be part of the third set 224 and meshed with the sixth gear 232. The seventh gear 234 may rotate freely about the intermediate shaft 227. The eighth gear 236 may be fastened, joined, or physically coupled to the intermediate shaft 227. Alternatively, there may not be an intermediate shaft 227, and there may only be the seventh gear 234 and the eighth gear 236. For an example configuration, the eighth gear 236 may mesh with the ring gear 172. When meshed with the ring gear 172, the eighth gear 236 may transmit rotational energy from intermediate shaft 227 and/or the seventh gear 234 to the ring gear 172. The intermediate shaft 227 may be an output shaft from the transmission gear train 130 to the ring gear 172. The eighth gear 236 may drivingly couple and transmit rotational energy from the third set 224 to the ring gear 172. Likewise, when selectively coupled to the seventh gear 234, the eighth gear 236 may drivingly couple and transmit rotational energy transferred through the second set 222 to the ring gear 172.

A plurality of clutches may be interposed between and drivingly couple elements of the second and third sets 222, 224 to shafts. The plurality of clutches may be used to drivingly couple sets of gears to a shaft, and drivingly couple gears of each of the gear pair together. The clutches may be interposed between and drivingly couple elements of the second and third sets 222, 224 to shafts.

For example, a second clutch 238 may drivingly couple the second set 222 to a gear of the third set 224. The second clutch 238 may drivingly couple the second set 222 to the intermediate shaft 227. A third clutch 240 may drivingly couple the third set 224 to the transmission input shaft 128 and/or a first gear of the second set 222.

For example, the second clutch 238 may be interposed between the fifth and sixth gears 230, 232. The second clutch 238 may selectively couple the fifth gear 230 to the sixth gear 232. When closed, the second clutch 238 may drivingly couple the fifth gear 230 to the sixth gear 232, and by extension the sixth gear 232 to the transmission input shaft 128. Likewise, a third clutch 240 may be interposed between the seventh and eighth gears 234, 236. The third clutch 240 may selectively couple the seventh gear 234 to the eighth gear 236. When selectively coupled, the seventh gear 234 may be drivingly coupled to the eighth gear 236, and by extension the seventh gear 234 may be drivingly coupled to the intermediate shaft 227.

For the second schematic 200, an embodiment of the transmission gear train 130 may drivingly couple to the ring gear 172 and mesh directly with the gears of a set, such as the third set 224. For an example, the ring gear 172 may be drivingly coupled and meshed with a gear of the third set 224. When the third clutch 240 is closed, rotational energy via torque may be transferred from gears of the second set 222 to the intermediate shaft 227. The torque may be transferred through the intermediate shaft 227 to the last gear of the third set 224. From the last gear of the third set 224, the rotational energy may be transferred to the ring gear 172. Likewise, when the second clutch 238 is closed, the rotational energy may be transferred from the first gear of the second set 222 to the first gear of the third set 224. The torque may be transferred through the gears of the second set 222. From the last gear of the third set 224, the rotational energy may be transferred to the ring gear 172. For this example, the ring gear 172 may be drivingly coupled and meshed with the eighth gear 236.

The second shaft 142 may act as an output for the first electric machine 120 and may be drivingly coupled to a first gear. (e.g., a first power take-off gear), of a PTO unit, such as a first gear of the first PTO unit 214. The first gear of the PTO unit is the input gear for the PTO unit, such as the input gear 179 of FIG. 1. The first gear may mesh with the fourth gear 178. The fourth gear 178 may transfer rotational energy via torque to the first gear of the first PTO unit 214. For this example, the first gear of the first PTO unit 214 may be a PTO gear 242.

The first PTO unit 214 may have a first optional disconnect 244 to selectively couple a first implement 246 to the first PTO unit 214. The first implement 246 may be a torque transferring implement. The first implement 246 may transfer torque to and drive a driven device, such as a first PTO device. For an example, the first PTO device may be a pump. When selectively coupled via the optional disconnect, the rotational energy transferred through the rotational elements of the first PTO unit may be transferred to a first implement 246. As an example, the first optional disconnect 244 may selectively couple the first implement 246 and a PTO shaft 248 to the PTO gear 242. The PTO shaft 248 may be an input shaft for the first implement 246 and a power take-off shaft for the first PTO unit 214. The PTO shaft 248 may support and drivingly couple to the first implement 246. Rotational energy transferred to the PTO gear 242 may be transferred to PTO shaft 248 and by extension the first implement 246. The PTO shaft 248 and first implement 246 may rotate in the direction of the PTO gear 242 and the torque.

For an example of the first PTO unit 214, the first optional disconnect 244 may be a simple disconnect. The optional disconnect may have a first lock 252 and a first shaft adapter 254. The first lock 252 may extend from the input gear via a gear arm 253. The gear arm 253 may be positioned to extend toward the first implement 246. Both the gear arm 253 and first lock 252 may be located about the PTO shaft 248. The first shaft adapter 254 may extend outwardly from the PTO shaft 248, such as radially with respect to the centerline and axis the PTO shaft 248 may be centered on. The first shaft adapter 254 may lock with the first lock 252 to selectively and drivingly couple the PTO gear 242 to the PTO shaft 248.

However, it is to be appreciated that there may be other configurations of optional disconnects. For example, an optional disconnect may selectively couple the first implement 246 to the PTO shaft 248, and the PTO shaft 248 may be drivingly coupled to the PTO gear 242. For another example of the first PTO unit 214, the first optional disconnect 244 may be a clutch, such as the same type of clutch as the first clutch 150, the second clutch 238, and/or the third clutch 240. For other examples of the first PTO unit 214, the first optional disconnect 244 may be a simple disconnect or a clutch.

The PTO housing 216 may have a first opening 256. Likewise, the transmission housing 204 may have a second opening 258. When the PTO housing 216 is fastened to the transmission housing 204, the first opening 256 and second opening 258 may interface. The first opening 256 and second opening 258 may interface, creating a passage for the first set 218 to extend through drivingly couple a shaft housed in transmission housing 204 and a shaft housed in the PTO housing 216. For example, the first set 218 may drivingly couple the second shaft 142 and PTO shaft 248 via the passage created by the first opening 256 and second opening 258 interfacing.

The clutches of the second schematic 200, such as the first clutch 150, the second clutch 238, and the third clutch 240, may be hydraulically operated wet clutches. The wet clutches may include sets of plates that frictionally engage and disengage one another, during clutch engagement and disengagement. The some of the aforementioned sets of plates may be supported by a drum, while the others may be supported by a hub.

The first clutch 150 may have a first drum 262 and a first hub 264. The first drum 262 may be fastened to, joined to, or physically coupled to the second shaft 142. The first hub 264 may be fastened to, joined to, or physically coupled to the third gear 148. The second clutch 238 may have a second drum 266 and a second hub 268. The second drum 266 may be fastened to, joined to, or physically coupled to the fifth gear 230. The second hub 268 may be fastened to, joined to, or physically coupled to the sixth gear 232. The third clutch 240 may have a third drum 270 and a third hub 272. The third drum 270 may be fastened to, joined to, or physically coupled to the eighth gear 236. The third hub 272 may be fastened to, joined to, or physically coupled to the seventh gear 234.

However, it is to be appreciated that the clutch type of the first clutch 150, second clutch 238, and third clutch 240 may be non-limiting. Alternatively, the clutches such as the first clutch 150, second clutch 238, and third clutch 240, may be dry friction clutches or other suitable alternative.

Turning to FIG. 3A, it shows a third schematic 300 of an example of a second PTO unit 302. The third schematic 300 isolates the second PTO unit 302 from the electric machines and inverters of FIG. 2. Likewise, the third schematic 300 isolates the second PTO unit 302 from the transmission housing 204 and rotational elements housed by the transmission housing 204 of FIG. 2, with exception to the fourth gear 178. The second PTO unit 302 may be a configuration of the PTO unit 122 of FIG. 1.

The PTO gear 242 and PTO shaft 248 may be centered about a first axis 308, such that the centerlines of the PTO gear 242 and PTO shaft 248 are collinear with the first axis 308. Likewise, a first shaft 312 may be centered about a second axis 310, such that the centerlines of the first shaft 312 and the gears that may be supported on the first shaft are collinear with the first axis 308. The first axis 308 and second axis 310 may be parallel. The first axis 308 and second axis 310 may be downstream from the fourth gear 178. The first axis 308 may be downstream of the second axis 310. The first axis 308 and second axis 310, and by extension the centerlines of the first shaft 312 and PTO shaft 248, may be separated by a first distance 314. The first distance 314 may be an effective distance for and distance of ratio between the first shaft 312 and PTO shaft 248.

The first shaft 312 may be a power take-off shaft for the second PTO unit 302. The first shaft 312 may support at least two gears. For an example, the second PTO unit 302 may have the first shaft 312 supporting and drivingly coupled to a first gear 322 and a second gear 324. When supported by the first shaft 312, the first gear 322 and second gear 324 may be centered about the second axis 310. The first gear 322 may be part of fourth gear set 316 when meshed with the fourth gear 178. The fourth gear set 316 may include the fourth gear 178 and the first gear 322. Likewise, the second gear 324 may be part of a fifth gear set 318 when meshed with the PTO gear 242. The fifth gear set 318 may include the second gear 324 and the PTO gear 242.

The PTO unit 122 may have a power take-off gear train that may be composed of at least a gear and a shaft of the PTO unit 122. The power take-off gear train may be a set of gears of the PTO unit 122 interposed between a first gear of the transmission housing 204 and a first power take-off gear that may transfer torque to a PTO implement, such as the PTO gear 242 and first implement 246. The second PTO unit 302 may have a power take-off gear train interposed between the fourth gear 178 and the PTO gear 242. The second PTO unit 302 may have a power take-off gear train comprised of the first gear 322, the first shaft 312, and the second gear 324.

When part of the fourth gear set 316, the fourth gear 178 may transmit rotational energy via torque to the first gear 322. The first gear 322 may rotate and transmit rotational energy via torque to the first shaft 312 and second gear 324. When meshed with the fifth gear set 318, the second gear 324 may transmit rotational energy via torque to the PTO gear 242. The PTO gear 242 may rotate in the direction of the torque transmitted from the second gear 324. If the PTO gear 242 is selectively coupled to the PTO shaft 248 via the first optional disconnect 244, the PTO gear 242 may rotate and transmit rotational energy via torque to the PTO shaft 248 and the first implement 246.

Turning to FIG. 3B, it shows a fourth schematic 326 of an example of a third PTO unit 328. Like the third schematic 300 of FIG. 3A, the fourth schematic 326 isolates the third PTO unit 328 from the electric machines and inverters of FIG. 2. Likewise, the fourth schematic 326 isolates the third PTO unit 328 from the transmission housing 204 and rotational elements housed by the transmission housing 204 of FIG. 2, with exception to the fourth gear 178. The third PTO unit 328 may be a configuration of the PTO unit 122 of FIG. 1.

PTO units, such as the third PTO unit 328, may be configured to have additional shafts compared to the second PTO unit 302 of FIG. 2. The third PTO unit 328 may have a second shaft 332 centered about a third axis 330, such that the centerline of the second shaft 332 may be collinear with the third axis 330. The second shaft 332 may be interposed between the first shaft 312 and the PTO shaft 248. The second shaft 332 may be located downstream of the first shaft 312 and upstream of the PTO shaft 248. The addition of the second shaft 332 and rotational elements supported by the second shaft, may increase the distance between the first axis 308 and second axis 310. The first axis 308 and second axis 310, and by extension the centerlines of the first shaft 312 and PTO shaft 248, may be separated by a second distance 334. The second distance 334 may be greater than the first distance 314 of FIG. 3A. The second distance 334 may increase the combined effective distance for ratios of gears between the first shaft 312 and PTO shaft 248.

The second shaft 332 may be a power take-off shaft for the third PTO unit 328. The second shaft 332 may support at least two gears. For an example, the third PTO unit 328 may have the second shaft 332 supporting and drivingly coupled to a third gear 342 and a fourth gear 344. When supported by the second shaft 332, the third gear 342 and fourth gear 344 may be centered about the third axis 330. The third gear 342 may be part of a sixth set 336 of gears when meshed with the second gear 324. The sixth set 336 may include the second gear 324 and the third gear 342. The sixth set 336 may drivingly couple and transmit rotational energy via torque between the first shaft 312 and the second shaft 332. Likewise, the fourth gear 344 may be part of a seventh set 338 of gears when meshed with the PTO gear 242. The seventh set 338 may include the fourth gear 344 and the PTO gear 242. The seventh set 338 may drivingly couple and transmit rotational energy via torque between the second shaft 332 and the PTO shaft 248.

The third PTO unit 328 may have a power take-off gear train interposed between the fourth gear 178 and the PTO gear 242. The third PTO unit 328 may have a power take-off gear train comprised of the first gear 322, the first shaft 312, the sixth set 336, the second shaft 332, and the fourth gear 344.

When part of the sixth set 336, the second gear 324 may transmit rotational energy via torque to the third gear 342. The third gear 342 may rotate and transmit rotational energy via torque to the second shaft 332 and the fourth gear 344. When meshed with the seventh set 338, the fourth gear 344 may transmit rotational energy via torque to the PTO gear 242. The PTO gear 242 may rotate in the direction of the torque transmitted from the fourth gear 344. If the PTO gear 242 is selectively coupled to the PTO shaft 248 via the first optional disconnect 244, the PTO gear 242 may rotate and transmit rotational energy via torque to the PTO shaft 248 and the first implement 246.

Turning to FIG. 3C, it shows a fifth schematic 358 of an example of a fourth PTO unit 360. Like third schematic 300 of FIG. 3A and fourth schematic 326 of FIG. 3B, the fifth schematic 358 isolates the fourth PTO unit 360 from the electric machines and inverters of FIG. 2. Likewise, the fifth schematic 358 isolates the fourth PTO unit 360 from the transmission housing 204 and rotational elements housed by the transmission housing 204 of FIG. 2, with exception to the fourth gear 178. The fourth PTO unit 360 may be a configuration of the PTO unit 122 of FIG. 1.

The fourth PTO unit 360 may have a power take-off gear train interposed between the fourth gear 178 and the PTO gear 242. The fourth PTO unit 360 may have a power take-off gear train comprised of the first gear 322, the first shaft 312, the sixth set 336, the second shaft 332, and the fourth gear 344. In addition to a first optional disconnect 244 and the first implement 246, the fourth PTO unit 360 may have a second optional disconnect 362 to selectively couple a second implement 364 to the fourth PTO unit 360. The second implement 364 may be a torque transferring implement. The second implement 364 may transfer torque to and drive a driven device. The second implement 364 may be used to drive a second PTO device, such as a pump. For example, the second implement 364, like the first implement 246, may be an impeller for a pump. When selectively coupled via the second optional disconnect 362, the rotational energy transferred through the rotational elements of the first PTO unit may be transferred to the second implement 364. As an example, the second optional disconnect 362 may selectively couple the second implement 364 and the PTO shaft 248 to the PTO gear 242. The PTO shaft 248 may support and drivingly couple to the second implement 364. Rotational energy transferred to the PTO gear 242 may be transferred to PTO shaft 248 and by extension the second implement 364. The PTO shaft 248 and second implement 364 may rotate in the direction of the PTO gear 242 and the torque.

For an example of the fourth PTO unit 360, the second optional disconnect 362 may be a simple disconnect. The second optional disconnect 362 may have a second lock 366 and a second shaft adapter 368. The first lock 252 may extend from the input gear via a second gear arm 367. The second gear arm 367 may be positioned to extend toward the second implement 364. Both the second gear arm 367 and the second lock 366 may be located about the PTO shaft 248. The second shaft adapter 368 may extend outwardly from the PTO shaft 248, such as radially with respect to first axis 308. The second shaft adapter 368 may lock with the second lock 366 to selectively and drivingly couple the PTO gear 242 to the PTO shaft 248.

However, it is to be appreciated that there may be other configurations of optional disconnects. For example, an optional disconnect may selectively couple the second implement 364 to the PTO shaft 248 and the PTO shaft 248 may be drivingly coupled to the PTO gear 242. For another example of the fourth PTO unit 360, the second optional disconnect 362 may be a clutch, such as the same type of clutch as the first clutch 150, the second clutch 238, and/or the third clutch 240 of FIG. 2.

It is also to be appreciated that there may be additional shafts that may be selectively coupled to the PTO gear 242. For example, the second implement 364 and second lock 366 may be drivingly coupled to a shaft, such as a second PTO shaft, centered about the first axis 308. The second PTO shaft may be separate from and rotate freely of the PTO shaft 248.

FIG. 4A and FIG. 4B are a first table 410 and a second table 420, respectively, illustrating operating modes of the disclosed electric axles, such as of the electric axle system 100 of FIG. 1. As one example, FIG. 4A may describe driving modes for an example electric axle having a first clutch, a second clutch, and a third clutch, such as described with respect to the second schematic 200 illustrated in FIG. 2. The first table 410 may also show a plurality of methods for engaging clutches to select a gear mode. Each column of table 410 may show a clutch that may be engaged. Each row of table 410 may show a method to engage a corresponding mode listed in the row. In one example, the clutches may be the same or similar to clutches, such as the first clutch 150, the second clutch 238, and the third clutch 240 of FIG. 2. FIG. 4B may describe PTO modes for an example electric axle system, such as electric axle system 100, having a first clutch. The second table 420 may show methods of selecting a clutch to engage a motor to a transmission and/or a PTO. Each column of table 410 shows whether torque is being delivered to a PTO and/or a transmission depending on if the clutch is engaged. Each row shows whether a first motor or a second motor is delivering torque. For example, the clutches may be the same or similar to first clutch 150 of FIGS. 1-2. As one example, by swapping clutches on the input shaft and the output shaft, e.g., transmission input shaft 128 and the intermediate shaft 227 of FIGS. 1-2, respectively, two gear ratios may be realized. These gear ratios may be the first gear ratio, e.g., Gear 1 mode, and the second gear ratio, e.g., Gear 2 mode. Additionally, there may be two additional discrete gear ratios. These discrete gear ratios occur when the first electric machine 120 and second electric machine 102 of FIGS. 1-2 send power in the form of rotational energy, via torque, to the transmission gear train 130 of FIGS. 1-2. In Gear 1 mode and Gear 2 mode, only the second electric machine 102 sends power to the transmission gear train 130. When power from first electric machine 120 and second electric machine 102 are transferred to the transmission gear train 130 and the first gear ratio is selected, the clutch application may be in Gear 1a mode. When power from first electric machine 120 and second electric machine 102 are transferred to the transmission gear train 130 and the second gear ratio is selected, the clutch application may be in Gear 2a mode. The Gear 1a and Gear 2a modes may occur when the first clutch 150 is adjusted closed, allowing rotational energy via torque from the first electric machine 120 to be transferred through the second shaft 142 to the motor input gear train 126, from the motor input gear train 126 to the transmission input shaft 128, and from the input shaft to the transmission gear train 130. Modes that use the first electric machine 120 and the second electric machine 102, such as the Gear 1a and Gear 2a modes, may be used to provide increased tractive effort at low speeds (e.g., less than 5 km/hr.) and increased speeds at moderate grade (e.g., between 25-50 km/hr.) compared to using a single electric machine to drive a hypoid gear set and an electric axle, such as the hypoid gear set 134 and axle 104 of FIG. 1. A high speed may be a rotational speed for the components of an axle 104 above a first threshold. For example, the first threshold may be 25 km/hr.

To simplify, Gear 1 may be a first mode and gear 2 may be a second mode. Gear 1a and Gear 2a may each be a third mode that is discrete.

The first table 410 depicts exemplary modes that may be realized using various clutch combinations. In one example, the modes include Gear 1, Gear 2, Gear 1a, Gear 2a, PTO EM1, and neutral. In one example, some of the gear ratios associated with the different modes may sequentially decrease. For instance, in one use-case example, the Gear 1 gear ratio may be 6.00:1, the Gear 2 gear ratio may be 2:1. However, numerous ratios for each mode have been contemplated. The clutches of the transmission gear train 130 for Gear 1 are engaged for Gear 1a. The clutches for the transmission gear train 130 for Gear 2 are engaged for Gear 2a. However, the first clutch 150 may be engaged to allow the first electric machine to transmit torque to the transmission gear train 130 in the Gear 1a and Gear 2a modes. The PTO EM1 mode may be a mode specifically for transferring power to a PTO unit, such as the PTO unit 122 of FIG. 1. The PTO unit 122 may be a PTO unit that is modular and of the present disclosure, such as the first PTO unit 214 of FIG. 2, second PTO unit 302 of FIG. 3A, third PTO unit 328 of FIG. 3B, and fourth PTO unit 360 of FIG. 3C. The PTO EM1 mode may be used with a plurality of other modes shown in the first table 410, wherein the first clutch 150 is not engaged. In one example, closing the second clutch 238 and the third clutch 240 results in locking the transmission. Operated in this way, the vehicle stays at standstill and the PTO unit may be driven by the first electric machine 120 while the second electric machine 102 may not be energized. The range of ratios as well as the step between the ratios in the different operating modes may be selected based on a variety of factors such as the expected operating speed range of the motor, the expected range of transmission loads, desired vehicle speed ranges, and the like.

The first table 410 illustrates a position of a first clutch, a second clutch, and a third clutch, such as the first clutch 150, second clutch 238, and third clutch 240, respectively. When a clutch is labeled OPEN in first table 410, the clutch is disengaged and in an open configuration. When a clutch is labeled CLOSED in the first table 410, the clutch is engaged and in a closed configuration.

The second table 420 illustrates modes of power application of a first electric motor and a second electric motor, such as the first electric machine 120 and second electric machine 102, respectively. The second table 420 illustrates modes of power application to the PTO and to the transmission, such as the PTO unit 122 and transmission gear train 130, from the first and second motor. The second table 420 illustrates the position of the first clutch, such as the first clutch 150, when a mode of power transfer is engaged.

Turning now to FIG. 4A, the modes of operation will be discussed herein with reference to electric axle system 100 and the second schematic 200 of FIG. 1 and FIG. 2, respectively.

In one example, the gear 1 mode of operation includes actuating the second clutch 238 to engage the first pair of gears 226 of FIG. 2 along the tail pass (−) and actuate the third clutch 240 to disengage the second pair of gears 228 of FIG. 2 along the head pass (+). In Gear 1, the power path travels from the transmission input shaft 128, of FIGS. 1-2, to the fifth gear 230, of FIG. 2; from the fifth gear 230 to the sixth gear 232, of FIG. 2; from the sixth gear 232 to the eighth gear 236 and intermediate shaft 227, of FIG. 2; and from the eighth gear 236 to the ring gear 172, of FIGS. 1-2. Subsequently, the power paths may travel through a differential, axle shafts, and to the drive wheels. Likewise, for Gear 1a mode, the second clutch 238 may be engaged and third clutch 240 may be disengaged as in Gear 1 mode. Additionally, for the Gear 1a mode, power may travel through the transmission input shaft 128, fifth gear 230, sixth gear 232, eighth gear 236, and ring gear 172 as described above for the Gear 1 mode. However, in Gear 1 mode, power as rotational energy may only be output to the transmission input shaft 128 from the second electric machine 102, and in Gear 1a mode power as rotational energy may be output to the transmission input shaft 128 from the first electric machine 120 and second electric machine 102.

In one example, the Gear 2 mode of operation includes the second clutch 238 to disengage the first pair of gears 226 along the tail pass (−) and actuate the third clutch 240 to engage the second pair of gears 228 along the head pass (+). In gear 2, transmission input shaft 128 to the fifth gear 230; from the fifth gear 230 to the seventh gear 234, of FIG. 2; from the seventh gear 234 to the eighth gear 236 and intermediate shaft 227, of FIG. 2; and from the eighth gear 236 to the ring gear 172. Subsequently, the power paths described above may travel through a differential, axle shafts, and to the drive wheels. Likewise, for Gear 2a mode, the second clutch 238 may be disengaged and third clutch 240 may be engaged as in the Gear 2 mode above. Additionally, for Gear 2a mode, power may travel through the transmission input shaft 128, fifth gear 230, seventh gear 234, eighth gear 236, intermediate shaft 227, and ring gear 172 as described above for the Gear 1 mode. However, in Gear 2 mode, power as rotational energy may only be output to the transmission input shaft 128 from the second electric machine 102, and in Gear 2a mode power as rotational energy may be output to the transmission input shaft 128 from the first electric machine 120 and second electric machine 102.

In one example, the PTO EM1 mode may be a mode in which the first electric motor, e.g., the first electric machine 120, may only provide power to a PTO unit, such as the first PTO unit 214, the second PTO unit 302, the third PTO unit 328, or the fourth PTO unit 360. The PTO EM1 mode may be engaged when the clutch 1, such as the first clutch 150, is disengaged such that power from the first electric machine 120 is not split between the PTO unit and the transmission, e.g., transmission gear train 130. Other gear modes, such as the Gear 1 or Gear 2, that transfer power to the transmission, e.g., the transmission gear train 130, without engaging clutch 1 may be used in conjunction with the PTO EM1 mode.

In one example, the neutral mode may have clutch 2, such as the second clutch 238, disengaged from the first pair of gears 226. Likewise, the neutral mode may have clutch 3, such as the third clutch 240, disengaged the second pair of gears 228. The PTO EM1 mode described above may be engaged while the transmission is in a neutral mode.

Turning now to FIG. 4B, the modes of operation will be discussed herein with reference to electric axle system 100 and second schematic 200 of FIG. 1 and FIG. 2, respectively. The PTO apply chart of the second table 420 shows where power generated from an electric machine may be transferred depending on the engagement of a first clutch 150.

The second table 420 illustrates modes of power application of a first electric motor and a second electric motor, EM1 and EM2 respectively in second table 420, to the PTO and to the transmission. The first electric motor and second electric motor may be the first electric machine 120 and second electric machine 102, respectively, of FIGS. 1-2. The second table 420 illustrates the position of the first clutch, such as the first clutch 150 of FIGS. 1-2, when a mode of power transfer is engaged.

For an example, if the first clutch 150 is open, rotational energy generated by a first electric motor, e.g., first electric machine 120, may be transferred only to a PTO unit, such as the PTO unit 122. Likewise, for this example, rotational energy generated by the second motor, e.g., second electric machine 102, may be transferred to the transmission, e.g., the transmission gear train 130 but not the PTO unit.

For another example, if the first clutch 150 is closed, rotational energy generated by the first electric motor, may be split between the PTO unit and the transmission. For this example, rotational energy generated by the second electric motor may be transferred to the transmission but not the PTO unit.

However, it is to be appreciated that for other examples, the first clutch 150 may be configured such that the first and second electric motor may transfer rotational energy to the PTO unit when the first clutch 150 is closed. For example, when coupled via closing the first clutch, the first and second electric motors run in a fixed rotation direction and torque may distributed to the PTO and the transmission. For these examples the first motor and second motor may be the first electric machine 120 and second electric machine 102, respectively. The first and second motors may transfer rotational energy to the transmission, when the torque generated by the first motor and second motor is in a first direction. Likewise, the first motor and second motor may transfer rotational energy to the transmission when the torque generated by the first motor and second motor is in a second direction opposite to the first direction. In such examples, the torque demand of the transmission and the PTO determines how the torque will be split and how much total torque is provided the two motors together, where the two motors do not necessarily provide the same torque.

Turning to FIG. 5, it shows a third table 510 of a plurality of modes of torque transfer to the rotational elements of a transmission and a PTO unit from a first motor and/or a second motor. The transmission includes a transmission gear train, such as the transmission gear train 130 of FIGS. 1-2. The transmission may be enclosed by a first housing, such as the transmission housing 204 of FIG. 2. The PTO unit may be the PTO unit 122 of FIG. 1. The first and second motors may be the first electric machine 120 and second electric machine 102, respectively, of FIGS. 1-2. Each torque mode of operation is complementary to a power flow through a clutch that for this example may be the first clutch 150 of FIGS. 1-2. Torque generated by the first electric motor or the second electric motor may be shown in the EM1 Torque Column and the EM2 Torque Column, respectively, of the third table 510. The torque may be a positive torque or a negative torque. When the torque is a positive torque, e.g., POSITIVE in third table 510, the torque is generated by and transmitted from a motor. When the torque is a negative torque, e.g., NEGATIVE in third table 510, the torque may be received by a motor from a rotational element coupled to the motor. Negative torque may be used for regeneration purposes, such as producing electricity to charge a power source electrically coupled to a motor, such as the battery 108 of FIG. 1.

The third table 510 shows a plurality of methods for selecting clutches to engage a power flow mode. A first column may show the status of a first clutch being open or closed. A second and third column may show whether a motor torque is positive or negative. Each row of table 510 may show a method to engage a corresponding power flow listed in the row.

The third table 510 illustrates the power application of a first electric motor and a second electric motor, such as the first electric machine 120 and second electric machine 102, respectively, to a PTO unit and to a transmission, such as the PTO unit 122 and transmission gear train 130, respectively. The third table 510 illustrates the position of the first clutch, such as the first clutch 150, when a mode of power transfer is engaged.

For an example, if the first clutch 150 is open, a first power flow may be generated by the first motor, e.g., the first electric machine 120, and/or a second power flow may be generated by a second motor, e.g., the second electric machine 102. The first power flow may be transmitted to the PTO when the first clutch is open and the first motor generates a positive torque. Likewise, the second power flow may be transmitted to the transmission when the when the first clutch is open and the second electric motor generates a positive torque. The first and second power flows of the third table 510 may be shown as a first power flow 612 and a second power flow 614, respectively, in greater detail in FIG. 6A below.

For another example, the first clutch, such as the first clutch 150, is closed. When the first clutch is closed, a combined power flow may be transmitted by the first motor and the second motor. The combined power flow may be generated when both the first motor and the second motor create a positive torque. The combined power flow may be a sum of a portion of the first power flow and the entirety of the second power flow of the third table 510. The combined power flow may be transmitted to the transmission. The combined power flow of the third table 510 may be shown as a shared power flow 624 in greater detail in FIG. 6B below.

For another example, if the first clutch 150 is closed, a first regenerative power flow may be transmitted from the first motor to the second motor. The first regenerative power flow may be generated when the first motor creates a positive torque and the second motor creates a negative torque. The regenerative power flow may be a portion of the first power flow of the third table 510. The regenerative power flow of the third table 510 may be shown as a fourth power flow 642 in greater detail in FIG. 6C below.

Turning to FIG. 6A, it shows a schematic 600. Schematic 600 may be the second schematic 200 of FIG. 2 and include the same components and features labeled in FIG. 2. Schematic 600 shows the path of a first power flow 612 and a second power flow 614 through the rotational elements of schematic 600. The first power flow 612 may be generated at the first electric machine 120 and transfer rotational energy via torque to the first PTO unit 214. The second power flow 614 may be generated at the second electric machine 102 and transfer rotational energy via torque to the transmission gear train 130. A positive or + symbol 610 is shown next to the first electric machine 120 and the second electric machine 102. The + symbol 610 indicates an electric machine, such as the first electric machine 120 or second electric machine 102, generates a positive torque.

When the first electric machine 120 generates a positive torque and the first clutch 150 is open, the first electric machine 120 generates the first power flow 612. The first power flow 612 may be generated via the rotational elements of the first electric machine 120 and be transmitted from the first electric machine 120 to the second shaft 142. The second shaft 142 may transfer the torque of the first power flow 612 to the fourth gear 178. When meshed with the first gear of a PTO unit, such as the first PTO unit 214, the fourth gear 178 may transfer torque of the first power flow 612 to the rotational elements of the PTO unit. The rotational elements of the PTO unit may transfer torque of the first power flow 612 to the implement of the PTO unit. For this example, the PTO unit may be the first PTO unit 214 and the first gear may be the PTO gear 242. However, for other examples the PTO unit may be other configurations of PTO units, such as the second PTO unit 302 of FIG. 3A, the third PTO unit 328 of FIG. 3B, or the fourth PTO unit 360 and the first gear may be the respective first gear of these aforementioned units.

When the second electric machine 102 generates a positive torque and the first clutch 150 is open, the second electric machine 102 may generate a second power flow 614. The second power flow 614 may be generated via the rotational elements of the second electric machine 102 and be transmitted from the second electric machine 102 to the first shaft 124. The first shaft 124 may transfer the torque of the second power flow 614 to the first gear 144. When part of the motor input gear train 126 and meshed with the second gear 146, the first gear 144 may transfer torque of the second power flow 614 to the second gear 146. The second gear 146 may transfer torque of the second power flow 614 to the transmission input shaft 128. The transmission input shaft 128 may transfer torque of the second power flow 614 to the transmission gear train 130.

Turning to FIG. 6B, it shows a schematic 620. Schematic 620 may be schematic 620 with the first clutch 150 closed. The closing of the first clutch 150, may allow for the shared power flow 624 to be created from addition of torque from the second power flow 614 and a third power flow 622.

The third power flow 622 may be split from first power flow 612 at the fourth gear 178. Excess energy from the first power flow 612 not used in the first PTO unit 214 may therein be used to drive the transmission gear train 130. The third power flow 622 may transfer rotational energy via torque from the fourth gear 178 to the second shaft 142. The third power flow 622 may transfer torque from the second shaft 142 to the third gear 148 via the first clutch 150. The third power flow 622 may transfer torque from the third gear 148 through the motor input gear train 126. As an example, the third power flow 622 may transfer rotational energy via torque to the second gear 146. The second power flow 614 may transfer rotational energy via torque to the second gear 146. The first electric machine 120 and second shaft 142 and the second electric machine 102 and first shaft 124 may be arranged such that the second power flow 614 and third power flow 622 are additive. The rotational energy of the second power flow 614 and the third power flow 622 may combine into the shared power flow 624 at the second gear 146. The shared power flow 624 may transfer rotational energy via torque from the second gear 146 to the transmission input shaft 128. The shared power flow 624 may transfer rotational energy via torque from the transmission input shaft 128 to the rotational elements of the transmission gear train 130.

Turning to FIG. 6C it shows a schematic 638. Schematic 638 may be schematic 620, wherein the first clutch 150 is closed but the second electric machine 102 generates a negative torque. A negative or − symbol 640 is shown next to the second electric machine 102. The − symbol 640 indicates an electric machine, such as the second electric machine 102, is generating a negative torque. When generating a negative torque, the second electric machine 102 may act as a generator or engage in another regenerative process. The closing of the first clutch, may allow for a fourth power flow 642 to be created from a power flow generated by the first electric machine 120. The fourth power flow 642 may distribute rotational energy via torque through the rotational elements of the motor input gear train 126. From the motor input gear train 126, the fourth power flow 642 may transfer rotational energy to the second electric machine 102. When the second electric machine 102 has a negative torque, the second electric machine 102 may be driven by via torque transferred from the fourth power flow 642. The torque transferred to the second electric machine 102 via the fourth power flow 642 may be used in regenerative processes, such using the second electric machine 102 as generator to generate electricity.

For one example, the clutches of the transmission gear train 130 may be open and in a neutral state. For this example, the third power flow 622 may be converted into the fourth power flow 642 at the second gear 146. The fourth power flow 642 may transfer rotational energy via torque from the second gear 146 to the first gear 144.

For another example, at least a clutch of the transmission gear train 130 may be closed. For this example, the third power flow 622 may be split into the fourth power flow 642 and a fifth power flow 644. The fifth power flow 644 may transfer rotational energy via torque into the transmission input shaft 128. From the transmission input shaft the fifth power flow 644 may transfer rotational energy into the rotational elements of the transmission gear train 130. The fourth power flow 642 may transfer rotational energy via torque from the second gear 146 to the first gear 144.

The fourth power flow 642 may transfer rotational energy via torque to the first shaft 124 from the first gear 144. The fourth power flow 642 may force the first shaft 124 and first gear 144 to rotate in the same direction. The fourth power flow 642 may transfer rotational energy via torque from the first shaft 124 to the rotational elements of the second electric machine 102. With the torque transferred by the fourth power flow 642 the rotational elements of the second electric machine 102 may rotate and convert rotational energy to electrical energy in a regenerative process.

The fifth power flow 644 may be negative as a result of regeneration coming from the wheels by deceleration of the vehicle using the second electric machine 102 as an electric brake or generator. In such an example, the negative flow of the fifth power flow 644 leads to the fourth power flow 642, allowing for regeneration of energy coming from the vehicle to be transferred to the batteries.

In this way, an electric axle may enable a modular PTO device to be drivingly and physically coupled to a transmission. The PTO device may be modular allowing for changes to the torque and rotational speed of an implement for a PTO device, without altering the rotational elements of the transmission and an electric axle system. The PTO device may be of a bolt on configuration, wherein a second housing of the PTO device may be fastened to a first housing of the transmission via fasteners, such as bolts. An electric machine, such as an electric motor, used to the PTO device may optionally drive an axle of the electric axle system, outputting the same torque to the motor gear train and by extension the transmission gear train if the rotational elements of the modular PTO device are changed.

The disclosure also provides support for an assembly comprising: a first electric motor coupled to a transmission via a first clutch, a second electric motor directly coupled to the transmission, a power take-off unit coupled to the first clutch, a first housing comprising the transmission, and a second housing comprising the power take-off unit, where the second housing is fastened to the first housing. In a first example of the system, the first housing further comprises the first clutch. In a second example of the system, optionally including the first example, the second housing further comprises the first clutch. In a third example of the system, optionally including one or both of the first and second examples, the transmission is a single speed or a multiple speed transmission. In a fourth example of the system, optionally including one or more or each of the first through third examples, the second housing further comprises a disconnect between the power take-off unit and a torque transferring implement to a driven device. In a fifth example of the system, optionally including one or more or each of the first through fourth examples, the disconnect may be a second clutch. In a sixth example of the system, optionally including one or more or each of the first through fifth examples, the disconnect may be a simple disconnect. In a seventh example of the system, optionally including one or more or each of the first through sixth examples, a first gear train drivingly couples the first electric motor and the second electric motor to a transmission input shaft. In an eighth example of the system, optionally including one or more or each of the first through seventh examples, the power take-off unit comprises a power take-off shaft drivingly coupled to a first power take-off gear, wherein the first power take-off gear is drivingly coupled to the first electric motor by a first gear. In a ninth example of the system, optionally including one or more or each of the first through eighth examples, the power take-off unit further comprises a power take-off gear train interposed between the first gear and the first power take-off gear, the power take-off gear train comprising a first shaft supporting a second gear and a third gear, wherein the second gear is drivingly coupled to the first gear and the third gear is drivingly coupled to the first power take-off gear.

The disclosure also provides support for a method for a transmission comprising a first electric motor coupled to a transmission input shaft via a first clutch, a second electric motor directly coupled to the transmission input shaft, a transmission gear train selectively coupling the transmission input shaft to an output shaft, a power take-off unit coupled to the first clutch, a first housing comprising the transmission gear train, and a second housing comprising the power take-off unit, where the second housing is fastened to the first housing, comprising: selecting a mode of operation, adjusting the first clutch to selectively couple the first electric motor to the transmission gear train, and adjusting one or more of a plurality of clutches of the transmission gear train based on the mode of operation. In a first example of the method, the plurality of clutches include a second clutch for selectively coupling one of a first pair of gears with the transmission input shaft and a third clutch for selectively coupling one of a second pair of gears with the output shaft. In a second example of the method, optionally including the first example, in a first mode comprising the first clutch in an open configuration, the second clutch in a closed configuration, and the third clutch in the open configuration, a first power flow is transmitted from the first electric motor to the power take-off unit, and a second power flow is transmitted from the second electric motor to the output shaft via engaging the first pair of gears and disengaging the second pair of gears. In a third example of the method, optionally including one or both of the first and second examples, in a second mode comprising the first clutch in the open configuration, the second clutch in the open configuration, and the third clutch in the closed configuration, the first power flow is transmitted from the first electric motor to the power take-off unit, and a third power flow is transmitted from the second electric motor to the output shaft via disengaging the first pair of gears and engaging the second pair of gears. In a fourth example of the method, optionally including one or more or each of the first through third examples, in a third mode comprising the first clutch in the closed configuration, one of the second clutch and the third clutch in the open configuration, and one of the second clutch and the third clutch in the closed configuration, a fourth power flow is transmitted from the transmission input shaft to the output shaft, the fourth power flow comprising rotational energy output to the transmission input shaft from the first electric motor and the second electric motor.

The disclosure also provides support for an assembly comprising: a first electric motor, a power take-off unit coupled to the first electric motor, an input gear train coupled to the first electric motor by a first clutch, a second electric motor coupled to input gear train, a transmission input shaft coupled to the input gear train, a transmission gear train coupled to the transmission input shaft, an output shaft coupled to the transmission gear train, a plurality of clutches for selectively coupling the transmission input shaft to the output shaft, a first housing comprising the transmission gear train, and a second housing comprising the power take-off unit, where the second housing is fastened to the first housing. In a first example of the system, the first electric motor selectively drives one or both of the power take-off unit and the output shaft via the first clutch. In a second example of the system, optionally including the first example, the plurality of clutches include a second clutch for selectively coupling one of a first pair of gears with the transmission input shaft and a third clutch for selectively coupling one of a second pair of gears with the output shaft. In a third example of the system, optionally including one or both of the first and second examples, the power take-off unit comprises a power take-off shaft drivingly coupled to a first power take-off gear, wherein the first power take-off gear is drivingly coupled to the first electric motor by a first gear of the input gear train. In a fourth example of the system, optionally including one or more or each of the first through third examples, the power take-off unit further comprises a power take-off gear train interposed between the first gear of the input gear train and the first power take-off gear, the power take-off gear train comprising a first shaft supporting a second gear and a third gear, wherein the second gear is drivingly coupled to the first gear of the input gear train and the third gear is drivingly coupled to the first power take-off gear.

In another representation, a method for an assembly is provided, the method comprising: operating one of a first clutch and a second clutch to shift between two operating modes in a transmission, the transmission directly coupled to a first motor, and selectively operating a PTO clutch to couple a second motor to the transmission, the second motor directly coupled to a PTO unit; wherein a first housing comprises the transmission and a second housing comprises the PTO unit.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible.

Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An assembly comprising:
    a first electric motor rotationally coupled and selectively coupled to a first gear train of a transmission via a first clutch and a first shaft;
    a second electric motor rotationally coupled to the first gear train of the transmission and directly coupled to a first gear of the first gear train via a second shaft;
    a power take-off unit coupled to the first clutch;
    a first housing comprising the transmission;
    a second housing comprising the power take-off unit, where the second housing is fastened to the first housing; and
    a power take-off gear set, the power take-off gear set drivingly coupled and interposed between the first electric motor and the first clutch and between the first electric motor and the power take-off unit, wherein a second gear of the power take-off gear set is directly coupled to the first shaft.

2. The assembly of claim 1, wherein the first housing further comprises the first clutch.

3. The assembly of claim 1, wherein the second housing further comprises the first clutch.

4. The assembly of claim 1, wherein the transmission is a single speed or a multiple speed transmission with a second gear train, the second gear train rotationally coupled to the first gear train via a third shaft.

5. The assembly of claim 1, wherein the second housing further comprises a disconnect between the power take-off unit and a torque transferring implement to a driven device.

6. The assembly of claim 5, wherein the disconnect may be a second clutch.

7. The assembly of claim 5, wherein the disconnect may be a simple disconnect.

8. The assembly of claim 4, wherein the first gear train drivingly couples the first electric motor and the second electric motor to the third shaft.

9. The assembly of claim 1, wherein the power take-off unit comprises a power take-off shaft drivingly coupled to a first power take-off gear, wherein the first power take-off gear is drivingly coupled to the first electric motor by the second gear.

10. The assembly of claim 9, wherein the power take-off unit further comprises a power take-off gear train interposed between the first gear and the first power take-off gear, the power take-off gear train comprising a third shaft supporting a third gear and a fourth gear, wherein the third gear is drivingly coupled to the first gear and the fourth gear is drivingly coupled to the first power take-off gear.

11. A method for a transmission comprising a first electric motor coupled to a transmission input shaft via a first clutch, a second electric motor directly coupled to the transmission input shaft, a transmission gear train selectively coupling the transmission input shaft to an output shaft, a power take-off unit coupled to the first clutch, a first housing comprising the transmission gear train; and a second housing comprising the power take-off unit, where the second housing is fastened to the first housing, comprising:
    selecting a mode of operation;
    adjusting the first clutch to selectively couple the first electric motor to the transmission gear train; and
    adjusting one or more of a plurality of clutches of the transmission gear train based on the mode of operation, wherein the plurality of clutches includes a second clutch for selectively coupling one of a first pair of gears with the transmission input shaft and at least a third clutch for selectively coupling one of a second pair of gears with the output shaft.

12. The method of claim 11, wherein in a first mode comprising the first clutch in an open configuration, the second clutch in a closed configuration, and the third clutch in the open configuration, a first power flow is transmitted from the first electric motor to the power take-off unit, and a second power flow is transmitted from the second electric motor to the output shaft via engaging the first pair of gears and disengaging the second pair of gears.

13. The method of claim 12, wherein in a second mode comprising the first clutch in the open configuration, the second clutch in the open configuration, and the third clutch in the closed configuration, the first power flow is transmitted from the first electric motor to the power take-off unit, and a third power flow is transmitted from the second electric motor to the output shaft via disengaging the first pair of gears and engaging the second pair of gears.

14. The method of claim 13, wherein in a third mode comprising the first clutch in the closed configuration, one of the second clutch and the third clutch in the open configuration, and one of the second clutch and the third clutch in the closed configuration, a fourth power flow is transmitted from the transmission input shaft to the output shaft, the fourth power flow comprising rotational energy output to the transmission input shaft from the first electric motor and the second electric motor.

15. An assembly comprising:
    a first electric motor;
    a power take-off unit coupled to the first electric motor;
    an input gear train coupled to the first electric motor by a first clutch;
    a second electric motor coupled to the input gear train;
    a transmission input shaft coupled to the input gear train;
    a transmission gear train coupled to the transmission input shaft;
    an output shaft coupled to the transmission gear train;
    a plurality of clutches for selectively coupling the transmission input shaft to the output shaft, the plurality of clutches includes a second clutch for selectively coupling one of a first pair of gears with the transmission input shaft and a third clutch for selectively coupling one of a second pair of gears with the output shaft;
    a first housing comprising the transmission gear train; and a second housing comprising the power take-off unit, where the second housing is fastened to the first housing.

16. The assembly of claim 15, wherein the first electric motor selectively drives one or both of the power take-off unit and the output shaft via the first clutch.

17. The assembly of claim 15, wherein the power take-off unit comprises a power take-off shaft drivingly coupled to a first power take-off gear, wherein the first power take-off gear is drivingly coupled to the first electric motor by a first gear of the input gear train.

18. The assembly of claim 17, wherein the power take-off unit further comprises a power take-off gear train interposed between the first gear of the input gear train and the first power take-off gear, the power take-off gear train comprising a first shaft supporting a second gear and a third gear, wherein the second gear is drivingly coupled to the first gear of the input gear train and the third gear is drivingly coupled to the first power take-off gear.

19. The assembly of claim 5, wherein the second housing comprises another torque transferring implement, the torque transferring implement and the another torque transferring implement rotationally coupled to a common shaft, and the another torque transferring implement opposite the torque transferring implement.

20. The assembly of claim 19, wherein the second housing further comprises another disconnect between the power take-off unit and the another torque transferring implement, the disconnect selectively coupling the torque transferring implement to the common shaft, and the another disconnect selectively coupling the another torque transferring implement to the common shaft.

* * * * *